(12) United States Patent
Kumar Agrawal et al.

(10) Patent No.: US 11,302,112 B1
(45) Date of Patent: Apr. 12, 2022

(54) ELECTRONIC DEVICES AND CORRESPONDING METHODS FOR ENROLLING FINGERPRINT DATA AND UNLOCKING AN ELECTRONIC DEVICE

(71) Applicant: Motorola Mobility LLC, Chicago, IL (US)

(72) Inventors: Amit Kumar Agrawal, Bangalore (IN); Caio Luiz Leal Chagas do Nascimento, Campinas (BR); Mahadevan Ayalur, Gurnee, IL (US)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/203,608

(22) Filed: Mar. 16, 2021

(51) Int. Cl.
*G06V 40/12* (2022.01)
*G06F 21/32* (2013.01)
*G06V 40/50* (2022.01)
*G06V 40/60* (2022.01)

(52) U.S. Cl.
CPC .......... *G06V 40/1365* (2022.01); *G06F 21/32* (2013.01); *G06V 40/50* (2022.01); *G06V 40/63* (2022.01)

(58) Field of Classification Search
CPC .... G06V 40/1365; G06V 40/50; G06V 40/63; G06F 21/32
See application file for complete search history.

(56) References Cited

U.S. PATENT DOCUMENTS 10,284,759 B2 5/2019 Wang et al.
10,616,460 B2 4/2020 Wang et al.
2010/0188353 A1 7/2010 Yoon et al.
2015/0078586 A1* 3/2015 Ang .................. H03G 3/04
                                              381/109
2018/0011590 A1* 1/2018 Lee .................. G06K 9/00087
2019/0012000 A1 1/2019 Cavallaro et al.
2019/0098187 A1 3/2019 Wang
(Continued)

OTHER PUBLICATIONS

Tyagi, et al., "Image Processing as a Function of Deformable Electronic Device Geometry and Corresponding Devices and Methods", U.S. Appl. No. 17/161,573, filed Jan. 28, 2021.
(Continued)

*Primary Examiner* — Abhishek Sarma
(74) *Attorney, Agent, or Firm* — Philip H. Burrus, IV

(57) ABSTRACT

An electronic device includes a memory storing a plurality of fingerprint reference data files and one or more sensors identifying whether a mechanical support condition of the electronic device is a hand supported condition or a surface supported condition. A fingerprint sensor receives fingerprint data while the electronic device is in the mechanical support condition. One or more processors select a prioritized fingerprint data reference file from the plurality of fingerprint reference data files as a function of the mechanical support condition and authenticate an authorized user of the electronic device by comparing the fingerprint data to the prioritized fingerprint data reference file before comparing the fingerprint data to any other fingerprint reference data files of the plurality of fingerprint reference data files. The prioritized fingerprint reference data file can also be selected as a function of a geometric form factor of the electronic device.

20 Claims, 8 Drawing Sheets

(56) References Cited

U.S. PATENT DOCUMENTS

2021/0248347 A1    8/2021  Seo
2021/0409539 A1   12/2021  Arellano et al.

OTHER PUBLICATIONS

Zhu, Xiafeng , "Electronic Devices and Corresponding Methods for Rotating Graphical Objects Presented on a Display", U.S. Appl. No. 16/517,005, filed Jul. 19, 2019.

Patel, Premal R, "Notice of Allowance", U.S. Appl. No. 17/203,616; Filed Mar. 16, 2021; dated Mar. 2, 2022.

* cited by examiner

ELECTRONIC DEVICES AND CORRESPONDING METHODS FOR ENROLLING FINGERPRINT DATA AND UNLOCKING AN ELECTRONIC DEVICE

BACKGROUND

Technical Field

This disclosure relates generally to electronic devices, and more particularly to electronic devices having displays.

Background Art

Portable electronic communication devices such as smartphones and tablet computers have become ubiquitous. People all over the world use such devices to stay connected.

These devices have been designed in various mechanical configurations. A first configuration, known as a "candy bar," is generally rectangular in shape and has a rigid form factor with a continually exposed display positioned on a major face of the electronic device. By contrast, a "clamshell" device has a mechanical hinge that allows one housing to pivot relative to the other, thereby concealing its display when closed and revealing the same when open. Some consumers prefer candy bar devices, while others prefer clamshell devices.

Regardless of device type, most consumers prefer dynamic user interface devices. This preference has led to the use of touch sensitive displays, rather than keyboards, as the primary user interface. Moreover, as display technology has improved, these displays have become increasingly larger. While suitable for serving as the primary user interface devices, most electronic devices require other user interface components such as buttons, biometric sensors, and other devices. It would be advantageous to have an improved electronic device that made the use of these auxiliary user interface devices more efficient.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
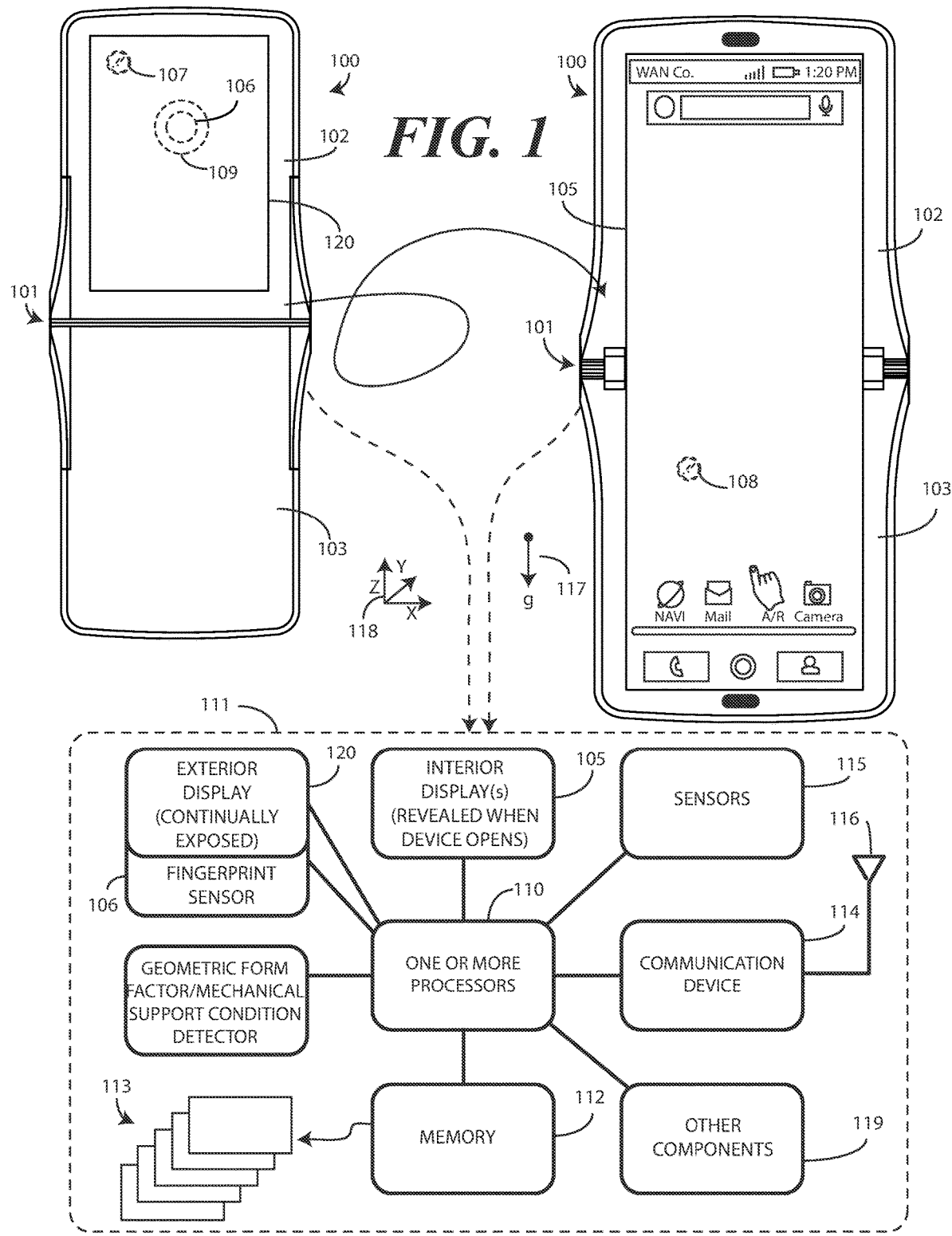
FIG. 1 illustrates explanatory electronic devices configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting a mechanical support condition for an electronic device, receiving fingerprint data, and comparing the fingerprint data to a preselected fingerprint data reference file that is selected as a function of the mechanical support condition before comparing the fingerprint data to any other fingerprint reference data files stored in a memory of the electronic device. Moreover, embodiments of the disclosure provide methods for enrolling preferred fingerprint reference data files to ensure that the most likely used fingerprint reference data files will be stored in the memory for commonly detected mechanical support conditions. Any process descriptions or blocks in flow charts should be understood as representing modules, segments, or portions of code that include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of enrolling preferred fingerprint reference data files so that, upon detecting a mechanical support condition of the electronic device when fingerprint data is received, the fingerprint data can be compared to a preselected fingerprint data reference file before comparing the fingerprint data to any other fingerprint reference data file stored in the memory of the electronic device. The non-processor circuits may include, but are not limited to, a radio receiver, a radio transmitter, signal drivers, clock circuits, power source circuits, and user input devices.

As such, these functions may be interpreted as steps of a method to select a preselected fingerprint data reference file from a plurality of fingerprint reference data files as a function of a mechanical support condition and authenticating an authorized user of the electronic device by comparing the fingerprint data to the preselected fingerprint data reference file before comparing the fingerprint data to any other fingerprint reference data file of the plurality of fingerprint reference data files as described below. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially", "essentially", "approximately", "about" or any other version thereof, are defined as being close to as understood by one of ordinary skill in the art, and in one non-limiting embodiment the term is defined to be within ten percent, in another embodiment within five percent, in another embodiment within 1 percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide faster and more efficient methods for authenticating an authorized user of an electronic device using a fingerprint sensor based upon a mechanical support condition of the electronic device when fingerprint data is received. Additionally, embodiments of the disclosure provide methods for ensuring that prioritized or preferred fingerprint data is enrolled and stored as fingerprint reference data files in a memory of the electronic device during an enrollment process. Advantageously, embodiments of the disclosure solve problems associated with situations where the fingerprint sensor might be difficult to reach, as well as in situations where the electronic device is supported by a surface such as a table. Moreover, for electronic devices having a first device housing that is pivotable about a hinge relative to a second device housing between a closed position and axially displaced open position, embodiments of the disclosure make the operation of the fingerprint sensor faster and more efficient by prioritizing the fingers that are most likely to be used as a function of not only the mechanical support condition, but also the geometric form factor of the electronic device as well.

In one or more embodiments, a method for enrolling fingerprint data as one or more fingerprint reference data files includes determining that an authorized user of the electronic device is initiating a fingerprint sensor enrollment sequence. In one or more embodiments, one or more processors of the electronic device then determine a device configuration of the electronic device, which may include determining whether the electronic device has a single display or multiple displays, and where the fingerprint sensor is situated on the electronic device, e.g., on the rear surface of the electronic device, under a display of the electronic device, on a minor surface of the electronic device or elsewhere.

In one or more embodiments, an image capture device of the electronic device then determines whether the authorized user is using a right hand or a left hand to perform the fingerprint enrollment process. From this information, the one or more processors of the electronic device ascertain the handedness of the person. It would be unlikely, for example, that an authorized user of an electronic device would initially use a left hand for fingerprint enrollment when they are righthanded, and vice versa. Accordingly, in one or more embodiments the one or more processors can use information from an imager or other sensor to determine a handedness of the user. The imager or other sensors can also be used to determine which finger the user is attempting to enroll as well.

In one or more embodiments, after determining the device category of the electronic device, a fingerprint sensor location of the fingerprint sensor, and a handedness of the authorized user, the one or more processors identify at least two fingerprint reference data file types as a function of these factors. For example, the one or more processors may identify a right thumb and index finger as at least two fingerprint reference data file types as a function of the device category, the fingerprint sensor location, and the handedness of the authorized user.

The one or more processors then detect enrollment of a first fingerprint reference data file type of the at least two fingerprint reference data file types. Once this finger is enrolled, to ensure that both of the at least two fingerprint reference data file types are enrolled, the one or more processors prompting, at a user interface of the electronic device, for enrollment of at least one other fingerprint reference data file type of the at least to fingerprint reference data file types before terminating the enrolling process.

Thereafter, the fingerprint reference data files can be prioritized to make unlocking the electronic device faster, more seamless, and more efficient. In one or more embodiments, the fingerprint reference data files are prioritized as a function of the geometric form factor of the electronic device and/or the mechanical support condition of the electronic device. Illustrating by example, in one embodiment, the one or more processors use one or more sensors to determine a mechanical support condition for the electronic device. The one or more processors also use the one or more sensors to determine a mechanical support condition of the electronic device.

When the fingerprint sensor receives the fingerprint data while the electronic device is in the detected mechanical support condition and/or at least one other condition, such as a geometric form factor, the one or more processors select one fingerprint reference data file from the at least two fingerprint reference data files as a function of these conditions. Thereafter, the one or more processors authenticate the authorized user of the electronic device by comparing the received fingerprint data to the selected fingerprint reference data file before comparing the fingerprint data to any other fingerprint reference data file stored in the memory.

Thus, the one or more processors can advantageously anticipate that the authorized user will used, for instance, an index finger to authenticate themselves based upon the geometric form factor and the mechanical support condition and compare the fingerprint data to the index finger fingerprint reference data file before comparing the fingerprint data to the thumb fingerprint reference data file in one or more embodiments. This streamlines the authentication process, which makes unlocking the electronic device faster and more efficient. When combined with the enrollment process that ensures that all likely fingers that will be used in the most likely mechanical support conditions and geometric form factors are enrolled, embodiments of the disclosure allow a user to more quickly unlock an electronic device. Embodiments of the disclosure also save power and processor cycles as well. Other advantages offered by embodiments of the disclosure will be described below. Still others will be obvious to those of ordinary skill in the art having the benefit of this disclosure.

Turning now to FIG. 1, illustrated therein is one explanatory electronic device 100 configured in accordance with one or more embodiments of the disclosure. The electronic device 100 of FIG. 1 is a portable electronic device. For illustrative purposes, the electronic device 100 is shown as a smartphone. However, the electronic device 100 could be any number of other devices as well, including tablet computers, gaming devices, multimedia players, and so forth. Still other types of electronic devices can be configured in accordance with one or more embodiments of the disclosure as will be readily appreciated by those of ordinary skill in the art having the benefit of this disclosure.

The electronic device 100 includes a first device housing 102 and a second device housing 103. In one or more embodiments, a hinge 101 couples the first device housing 102 to the second device housing 103. In one or more embodiments, the first device housing 102 is selectively pivotable about the hinge 101 relative to the second device housing 103. For example, in one or more embodiments the first device housing 102 is selectively pivotable about the hinge 101 between a closed position, shown and described below with reference to FIGS. 7-8 and the open position shown in FIG. 1.

In one or more embodiments the first device housing 102 and the second device housing 103 are manufactured from a rigid material such as a rigid thermoplastic, metal, or composite material, although other materials can be used. Still other constructs will be obvious to those of ordinary skill in the art having the benefit of this disclosure. In the illustrative embodiment of FIG. 1, the electronic device 100 includes a single hinge 101. However, in other embodiments two or more hinges can be incorporated into the electronic device 100 to allow it to be folded in multiple locations.

While the illustrative electronic device 100 of FIG. 1 includes a hinge 101, embodiments of the disclosure are not so limited. In other embodiments, the electronic device 100 will be bendable, but will not include a hinge 101, such as when the first device housing 102 and the second device housing 103 are manufactured from bendable materials. In still other embodiments, the electronic device 100 can be bendable via a combination of hinge components and non-hinge components.

Illustrating by example, in another embodiment the electronic device housing can exclude a hinge and instead be flexible with a bending region that allows the electronic device housing to bend and flex between the axially displaced open position and the closed position. In such an embodiment, the electronic device housing may be manufactured from a malleable, bendable, or physically deformable material such as a flexible thermoplastic, flexible composite material, flexible fiber material, flexible metal, organic or inorganic textile or polymer material, or other materials. The electronic device housing could be formed from a single flexible housing member or from multiple flexible housing members.

In other embodiments, the electronic device housing could be a composite of multiple components. For instance, in another embodiment the electronic device housing could be a combination of rigid segments connected by hinges or flexible materials. Still other constructs will be obvious to those of ordinary skill in the art having the benefit of this disclosure.

In one or more embodiments the electronic device 100 of FIG. 1 includes at least one display 105. The illustrative embodiment of FIG. 1 includes multiple displays. Display 105 serves as a first display and is also referred to as the interior display or the rear-facing display. Display 105 is concealed when the first device housing 102 is pivoted about the hinge 101 relative to the second device housing 103 to a closed position. Illustrating by example, display 105 is concealed in FIGS. 7-8 below. Display 105 is then revealed when the first device housing 102 is pivoted about the hinge 101 relative to the second device housing 103 from the closed position to an axially displaced open position shown in FIG. 1. Thus, display 105 is revealed as the electronic device 100 transitions from the closed position of FIGS. 7-8 to the open position of FIG. 1.

The explanatory electronic device 100 of FIG. 1 also includes at least one additional display. As shown in FIG. 1, the electronic device 100 includes a second display 120, which can be referred to as an exterior display or front-facing display. This nomenclature arises due to the fact that the second display 120 is exposed both when the first device housing 102 and the second device housing 103 are pivoted about the hinge 101 to the closed position or the axially displaced open position. Thus, the second display 120 is exposed both in the axially displaced open position of FIG. 1 and the closed position of FIG. 3. In one or more embodiments, each of the first display 105 and the second display 120 is a high-resolution display.

While shown coupled to the first device housing 102, it should be noted that the second display 120 could be coupled to either of the first device housing 102 or the second device housing 103. In other embodiments, the second display 120 can be coupled to the first device housing 102, while a third display (not shown) is coupled to the second device housing 103, and so forth. Thus, electronic devices configured in accordance with embodiments of the disclosure can include displays situated at different positions.

As with the second display 120, display 105 can also be coupled to either or both of the first device housing 102 or the second device housing 103. In this illustrative embodiment, display 105 is coupled to both the first device housing 102 and the second device housing 103 and spans the hinge 101. As noted above, display 105 is considered to be an "interior" display because it is concealed when the first device housing 102 and the second device housing 103 are in the closed position.

In one or more embodiments, either or both of display 105 and/or display 120 can be touch-sensitive. Where this is the case, users can deliver user input to one or both of display 105 or the second display 120 by delivering touch input from a finger, stylus, or other objects disposed proximately with display 105 or the second display 120.

In the illustrative embodiment of FIG. 1, since display 105 spans the hinge 101, it is configured as a flexible display that can bend, deflect, and deform into different shapes. For instance, in one embodiment display 105 is configured as a foldable organic light emitting diode (OLED) display coupled to a foldable substrate. The foldable substrate can be manufactured from various materials, including flexible plastic layers, flexible metal layers, flexible composite layers, or of other materials. In one embodiment, the foldable substrate is manufactured from stainless steel. Others will be obvious to those of ordinary skill in the art having the benefit of this disclosure. Where manufactured with a foldable substrate, this substrate allows display 105 to be flexible so as to deform when the first device housing 102 pivots about the hinge 101 relative to the second device housing 103.

In one or more embodiments, a user interface component, which may be a button or touch sensitive surface, can also be disposed along one or both of the first device housing 102 and/or the second device housing 103 to facilitate control of the electronic device 100. In the illustrative embodiment of FIG. 1, the user interface component comprises a fingerprint sensor 106 positioned under the second display 120 of the electronic device 100. In other embodiments, the user interface component will be placed to the side of the second display 120, rather than beneath the second display 120.

Other features can be added and can be located on the front of one or both of the first device housing 102 and/or the second device housing 103, sides of one or both of the first device housing 102 and/or the second device housing 103, and/or the rear of one or both of the first device housing 102 and/or the second device housing 103. Illustrating by example, in one or more embodiments a first image capture device 107 can be disposed on one side of the electronic device 100, while a second image capture device 108 is disposed on another side of the electronic device 100. In the illustrative embodiment of FIG. 1, each of the first image capture device 107 and the second image capture device 108 is positioned beneath the second display 120 and the first display 105, respectively. However, in other embodiments, the first image capture device 107 and the second image capture device 108 could be placed beside their respective displays, rather than beneath the same. Of course, a combination of beside/beneath placements can be used as well.

In this illustrative embodiment, image capture device 107 is positioned beneath display 120 while image capture device 108 is positioned beneath display 105. In one or more embodiments, one or both of the first display 105 and/or the second display 120 includes a first pixel portion and a second pixel portion. Using the second display 120 as an illustrative example, a first pixel portion (the area of display 120 within circle 109) is situated above fingerprint sensor 106 (with another first pixel portion situated above image capture device 107) and a second pixel portion (the area of display 120 outside circle 109) situated at areas of the display 120 other than those positioned above the fingerprint sensor 106 and the image capture device 107. The first display 105 can be similarly configured, with a first pixel portion situated above image capture device 108 and a second pixel portion situated at areas of the display 105 other than those positioned above the and the image capture device 108.

In one embodiment, the first pixel portion comprises only transparent organic light emitting diode pixels. In another embodiment, the pixels disposed in the first pixel portion comprise a combination of transparent organic light emitting diode pixels and reflective organic light emitting diode pixels. Other configurations will be obvious to those of ordinary skill in the art having the benefit of this disclosure.

In one or more embodiments, the entire extent of the displays 105,120 is available for presenting images. While some borders are shown in FIG. 1, in other embodiments there is no need for the first device housing 102 or the second device housing 103 of the electronic device 100 to include borders that picture frame the first display 105 or the second device housing 103. To the contrary, in one or more embodiments one or both of the first display 105 and/or the second display 120 can span an entire major face of the electronic device 100 so that the entirety of the major face can be used as active display area.

One way that the amount of surface area of the first device housing 102 and the second device housing 103 covered by the first display 105 or the second display 120 can be expanded is by placing the various sensors, e.g., image capture devices 107,108 and the fingerprint sensor 106, beneath the first pixel portion such that the fingerprint sensor 106, the image capture devices 107,108, and/or any other sensors are collocated with the first pixel portion or portions. This allows the fingerprint sensor 106, the image capture devices 107,108, and/or the other sensors to receive signals through the transparent portions of the first pixel portion.

In one or more embodiments, the second pixel portion comprises only reflective light emitting diode pixels. Content can be presented on a first pixel portion comprising only transparent organic light emitting diode pixels or sub-pixels or a combination of transparent organic light emitting diode pixels or sub-pixels and reflective organic light emitting diode pixels or sub-pixels. The content can also be presented on the second pixel portion comprising only the reflective organic light emitting diode pixels or sub-pixels.

When a user desires to capture an image with either or both of image capture device 107 or image capture device 108, or when touch input delivering fingerprint data to the fingerprint sensor 106 is detected upon the second display 120, one or more processors 110 of the electronic device 100 cause the transparent organic light emitting diode pixels or sub-pixels to cease emitting light in one or more embodiments. This cessation of light emission prevents light emitted from the transparent organic light emitting diode pixels or sub-pixels from interfering with light or fingerprint data incident upon the first pixel portion. When the transparent organic light emitting diode pixels or sub-pixels are turned OFF, they become optically transparent in one or more embodiments.

In some embodiments, the second pixel portion will then remain ON when the first pixel portion ceases to emit light. However, in other embodiments the second pixel portion will be turned OFF as well. The requisite image capture device 107,108 or the fingerprint sensor 106 can then be actuated to capture the fingerprint data and/or an image from the light passing through the transparent organic light emitting diode pixels or sub-pixels. Thereafter, the one or more processors 110 can resume the presentation of data along the first pixel portion of the display 105,120. In one or more embodiments, this comprises actuating the transparent organic light emitting diode pixels or sub-pixels, thereby causing them to again begin emitting light.

A block diagram schematic 111 of the electronic device 100 is also shown in FIG. 1. In one or more embodiments, the block diagram schematic 111 is configured as a printed circuit board assembly disposed within one or both of the first device housing 102 or the second device housing 103. Various components can be electrically coupled together by conductors or a bus disposed along one or more printed circuit boards, which can optionally be flexible circuit boards or alternatively rigid circuit boards coupled together by one or more flexible conductors or substrates. It should be noted that the block diagram schematic 111 includes many components that are optional, but which are included in an effort to demonstrate how varied electronic devices configured in accordance with embodiments of the disclosure can be.

Thus, it is to be understood that the block diagram schematic 111 of FIG. 1 is provided for illustrative purposes only and for illustrating components of one electronic device 100 in accordance with embodiments of the disclosure. The block diagram schematic 111 of FIG. 1 is not intended to be a complete schematic diagram of the various components required for an electronic device 100. Therefore, other electronic devices in accordance with embodiments of the disclosure may include various other components not shown in FIG. 1 or may include a combination of two or more components or a division of a particular component into two or more separate components, and still be within the scope of the present disclosure.

In one embodiment, the electronic device 100 includes one or more processors 110. The one or more processors 110 can be a microprocessor, a group of processing components, one or more Application Specific Integrated Circuits (ASICs), programmable logic, or other type of processing device. The one or more processors 110 can be operable with the various components of the electronic device 100. The one or more processors 110 can be configured to process and execute executable software code to perform the various functions of the electronic device 100. A storage device, such as memory 112, can optionally store the executable software code used by the one or more processors 110 during operation.

In one or more embodiments, the one or more processors 110 are responsible for transitioning the electronic device 100 from a locked mode of operation to an active mode of operation. In one or more embodiments, the electronic device 100 includes a security mechanism that places the electronic device 100 in a locked mode of operation to prevent unauthorized users from accessing the electronic device 100 or the data stored in the memory 112. Accordingly, in one or more embodiments the electronic device 100 can be referred to as a "lockable device" in that the one or more processors 110 can selectively actuate a security mechanism that prevents unauthorized persons from accessing or logging on to the electronic device 100. Examples of such mechanisms include password protected login screens, screensavers, voice command login mechanism using voice recognition, voice password entry, and so forth. In the illustrative embodiment of FIG. 1, the security mechanism includes authentication of an authorized user of the electronic device 100 using the fingerprint sensor 106, as will be described in more detail below. Other examples of security mechanisms will be obvious to those of ordinary skill in the art having the benefit of this disclosure.

In the illustrative embodiment of FIG. 1, the electronic device 100 is a lockable device capable of being transitioned between a locked mode of operation and an active mode of operation. A person can authenticate themselves as an authorized user of the electronic device 100 by delivering fingerprint data to the fingerprint sensor 106 for authentication by the one or more processors 110. Using the fingerprint sensor 106, the one or more processors 110 can detect fingerprint data when a person places their finger upon the second display 120 at a location situated atop the fingerprint sensor 106. The one or more processors 110 can then compare this received fingerprint data with one or more fingerprint reference data files 113 stored in the memory 112 of the electronic device 100 to determine whether the fingerprint data sufficiently matches one of the one or more fingerprint reference data files 113. Where it does, the one or more processors 110 can transition the electronic device 100 from a locked mode of operation to an active mode of operation. In one or more embodiments, this includes causing the presentation of content to occur on one or both of the first display 105 and/or the second display 120 when the electronic device 100 is in the active mode of operation.

In one or more embodiments, the one or more processors 110 are further responsible for performing the primary functions of the electronic device 100. For example, in one embodiment the one or more processors 110 comprise one or more circuits operable to present presentation information, such as images, text, and video, on one or both of the first display 105 and/or the second display 120. The executable software code used by the one or more processors 110 can be configured as one or more modules stored in the memory 112 that are operable with the one or more processors 110. Such modules can store instructions, control algorithms, and so forth.

In one embodiment, the one or more processors 110 are responsible for running the operating system environment. The operating system environment can include a kernel, one or more drivers, and an application service layer, and an application layer. The operating system environment can be configured as executable code operating on one or more processors or control circuits of the electronic device 100.

In one or more embodiments, the one or more processors 110 are responsible for managing the applications of the electronic device 100. In one or more embodiments, the one or more processors 110 are also responsible for launching, monitoring and killing the various applications and the various application service modules. The applications of the application layer can be configured as clients of the application service layer to communicate with services through application program interfaces (APIs), messages, events, or other inter-process communication interfaces.

In one or more embodiments, the fingerprint sensor 106 situated beneath the second display 120 is operable with the one or more processors 110. In one embodiment, the fingerprint sensor 106 includes its own processor to perform various functions, including detecting a finger touching the second display 120 atop the fingerprint sensor 106, capturing and storing fingerprint data from the finger, detecting user actions across a surface of the second device housing 103 situated atop the fingerprint sensor 106. The processor of the fingerprint sensor 106 can optionally perform at least one pre-processing step while the one or more processors 110 are in a low power or sleep mode in the locked mode of operation. Upon receiving a request from the one or more processors 110 for the fingerprint data, the fingerprint sensor 106 can deliver the fingerprint data to the one or more processors 110. In one or more embodiments the processor of the fingerprint sensor 106 can, as one pre-processing step, perform a preliminary authentication of the user by comparing fingerprint data captured by the fingerprint sensor 106 to a fingerprint data reference file 113 stored in the memory 112. The processor of the fingerprint sensor 106 can be an on-board processor. Alternatively, the processor can be a secondary processor that is external to, but operable with, the fingerprint sensor in another embodiment. Other configurations will be obvious to those of ordinary skill in the art having the benefit of this disclosure.

In one embodiment, the fingerprint sensor 106 can include a plurality of sensors. The fingerprint sensor 106 can be a complementary metal-oxide-semiconductor active pixel sensor digital imager or any other fingerprint sensor. The fingerprint sensor 106 can be configured to capture, with the plurality of sensors, a live scan of a fingerprint pattern from a finger disposed along its surface, and to store this information as fingerprint data from the user's finger. The fingerprint sensor 106 may also be able to capture one or more images with the plurality of sensors. The images can correspond to an area beneath a surface of skin. The fingerprint sensor 106 can compare the fingerprint data or skin images to one or more fingerprint reference data files 113 to authenticate a user in an authentication process.

In this illustrative embodiment, the electronic device 100 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications, and other forms of wireless communication such as infrared technology. The communication circuit 114 can include wireless communication circuitry, one of a receiver, a transmitter, or transceiver, and one or more antennas 116.

In one embodiment, the electronic device 100 includes one or more sensors 115 operable to determine one or more conditions of the electronic device 100. Examples of the conditions that the one or more sensors 115 can detect include a geometric form factor of the electronic device, which hand a user is using to enroll fingerprint data at the electronic device 100, which finger a user is using to enroll fingerprint data at the electronic device 100, a mechanical support condition of the electronic device 100, such as whether the electronic device 100 is being held or is supported by a table or other flat surface, and other conditions.

The one or more processors 110 may generate commands or execute control operations based on information received from the first image capture device 107, the second image capture device 108, the one or more sensors 115, and/or the other components 119 of the electronic device 100. The one or more processors 110 may also generate commands or execute control operations based upon information received from a combination of these components. Moreover, the one or more processors 110 may process the received information alone or in combination with other data, such as the information stored in the memory 112.

Illustrating by example, in one or more embodiments the one or more sensors 115 detect angles between the first device housing 102 and the second device housing 103 as these device housings pivot relative to each other about the hinge 101. This information can be used to detect the geometric form factor of the electronic device 100. The one or more sensors 115 can detect the first device housing 102 pivoting about the hinge 101 relative to the second device housing 103, for example.

In one or more embodiments, the one or more sensors 115 identify whether a mechanical support condition of the electronic device 100 is a hand supported condition or a surface supported condition. This information can be used to streamline the unlocking process. To wit, in one or more embodiments the fingerprint sensor 106 receives fingerprint data while the electronic device 100 is in the mechanical support condition identified by the one or more sensors 115. The one or more processors 110 then select a prioritized fingerprint reference data file from the plurality of fingerprint reference data files 113 stored in the memory 112 as a function of the mechanical support condition for initial use in authenticating a person as an authorized user of the electronic device 100. In one or more embodiments, the one or more processors 110 authenticate an authorized user of the electronic device 100 by comparing the fingerprint data received while the electronic device 100 is in the mechanical support condition to the prioritized fingerprint reference data file before comparing the fingerprint data to any other fingerprint reference data files of the plurality of fingerprint reference data files 113. In one or more embodiments, the one or more processors 110 then unlock the electronic device 100 in response to authenticating the authorized user of the electronic device 100. Other factors determined by the one or more sensors 115 can be used in selecting the prioritized fingerprint reference data file as well, including the geometric form factor of the electronic device 100, the handedness of the user, and so forth.

The one or more sensors 115 used to determine these factors can take various forms. Illustrating by example, in one or more embodiments the one or more sensors 115 comprise one or more flex sensors operable to detect the geometric form factor of the electronic device 100. The one or more flex sensors can be supported by the first device housing 102 and/or second device housing 103 and operable with the one or more processors 110 to detect a bending operation deforming the electronic device 100 into a deformed geometric form factor, examples of which are shown below in FIGS. 7-8. The inclusion of flex sensors is optional, and in some embodiment flex sensors will not be included.

Where included, in one embodiment the flex sensors each comprise passive resistive devices manufactured from a material with an impedance that changes when the material is bent, deformed, or flexed. By detecting changes in the impedance as a function of resistance, the one or more processors 110 can use the one or more flex sensors to detect bending or flexing. In one or more embodiments, each flex sensor comprises a bi-directional flex sensor that can detect flexing or bending in two directions. In one embodiment, the one or more flex sensors have an impedance that increases in an amount that is proportional with the amount it is deformed or bent.

In one embodiment, each flex sensor is manufactured from a series of layers combined together in a stacked structure. In one embodiment, at least one layer is conductive, and is manufactured from a metal foil such as copper. A resistive material provides another layer. These layers can be adhesively coupled together in one or more embodiments. The resistive material can be manufactured from a variety of partially conductive materials, including paperbased materials, plastic-based materials, metallic materials, and textile-based materials. In one embodiment, a thermoplastic such as polyethylene can be impregnated with carbon or metal so as to be partially conductive, while at the same time being flexible.

In one embodiment, the resistive layer is sandwiched between two conductive layers. Electrical current flows into one conductive layer, through the resistive layer, and out of the other conductive layer. As the flex sensor bends, the impedance of the resistive layer changes, thereby altering the flow of current for a given voltage. The one or more processors 110 can detect this change to determine an amount of bending. Taps can be added along each flex sensor to determine other information, including the number of folds, the degree of each fold, the location of the folds, the direction of the folds, and so forth. The flex sensor can further be driven by time-varying signals to increase the amount of information obtained from the flex sensor as well.

While a multi-layered device as a flex sensor is one configuration suitable for detecting a bending operation occurring to deform the electronic device 100 and a geometric form factor of the electronic device 100 after the bending operation, the other sensors 115 for detecting the one or more conditions of the electronic device 100 can include other sensors for detecting the geometric form factor as well. For instance, a magnet can be placed in the first device housing 102 while a magnetic sensor is placed in the second device housing 103, or vice versa. The magnetic sensor could be Hall-effect sensor, a giant magnetoresistance effect sensor, a tunnel magnetoresistance effect sensor, an anisotropic magnetoresistive sensor, or other type of sensor.

In still other embodiments, the one or more sensors 115 can comprise an inductive coil placed in the first device housing 102 and a piece of metal placed in the second device housing 103, or vice versa. When the metal is in close proximity to the coil, the one or more sensors 115 detect the first device housing 102 and the second device housing 103 in a first position. By contrast, when the metal is farther away from the coil, the one or more sensors 115 can detect the first device housing 102 and the second device housing 103 being in a second position, and so forth.

In other embodiments the one or more sensors 115 can comprise an inertial motion unit situated in the first device housing 102 and another inertial motion unit situated in the second device housing 103. The one or more processors 110 can compare motion sensor readings from each inertial motion unit to track the relative movement and/or position of the first device housing 102 relative to the second device housing 103 to detect the geometric form factor of the electronic device 100. The one or more inertial motion units can also work to determine the position of the first device housing 102 and the second device housing 103 relative to the direction of gravity 117.

Instead of, or in addition to, inertial motion units, the one or more sensors 115 can include a gravity detector. For example, as one or more accelerometers and/or gyroscopes may be used to show vertical orientation, constant, or a measurement of tilt relative to a direction of gravity 117. Accordingly, in one or more embodiments, the one or more processors 110 can use the gravity detector to determine an orientation of the electronic device 100 in three-dimensional space 118 relative to the direction of gravity 117.

This information can be used to detect the mechanical support condition of the electronic device. For example, when the electronic device 100 is lying on a horizontal surface such as a table, the direction of gravity 117 will pass orthogonally through a major face of the first device housing 102 and the second device housing 103. If the electronic device 100 is closed, the direction of gravity 117 will pass in opposite directions through the first device housing 102 and the second device housing 103, e.g., from outside to in through one and from inside to out through the other. By contrast, when the first device housing 102 and the second device housing 103 are pivoted to the open position when the electronic device 100 is resting on a surface, the direction of gravity 117 will pass in the same direction through the first device housing 102 and the second device housing 103. When a user is holding the electronic device 100, it is rarely the case that the direction of gravity 117 will orient in this fashion, as the user rarely holds the electronic device 100 in a fully horizontal condition. Accordingly, the direction of gravity 117 can be used to determine the mechanical support condition of the electronic device 100. This data can also be used to determine and or track the state and position of the first device housing 102 and the second device housing 103 directly as they pivot about the hinge 101 to determine the geometric form factor of the electronic device 100.

Where included with the one or more sensors 115, each inertial motion unit can comprise a combination of one or more accelerometers, one or more gyroscopes, and optionally one or more magnetometers, to determine the orientation, angular velocity, and/or specific force of one or both of the first device housing 102 or the second device housing 103. When included in the electronic device 100, these inertial motion units can be used as orientation sensors to measure the orientation of one or both of the first device housing 102 or the second device housing 103 in three-dimensional space 118. Similarly, the inertial motion units can be used as orientation sensors to measure the motion of one or both of the first device housing 102 or second device housing 103 in three-dimensional space 118. If, for example, the electronic device 100 is moving in a repetitive motion consistent with a walking or running motion, the one or more processors 110 of the electronic device 100 may use this information to determine that the electronic device 100 is being held rather than sitting on a stationary surface, for example. The inertial motion units can be used to make other measurements as well.

Where only one inertial motion unit is included in the first device housing 102, this inertial motion unit is configured to determine an orientation, which can include measurements of azimuth, plumb, tilt, velocity, angular velocity, acceleration, and angular acceleration, of the first device housing 102. Similarly, where two inertial motion units are included, with one inertial motion unit being situated in the first device housing 102 and another inertial motion unit being situated in the second device housing 103, each inertial motion unit determines the orientation of its respective device housing. Inertial motion unit can determine measurements of azimuth, plumb, tilt, velocity, angular velocity, acceleration, angular acceleration, and so forth of the first device housing 102, while inertial motion unit can determine measurements of azimuth, plumb, tilt, velocity, angular velocity, acceleration, angular acceleration, and so forth of the second device housing 103, and so forth.

In one or more embodiments, each inertial motion unit delivers these orientation measurements to the one or more processors 110 in the form of orientation determination signals. Thus, the inertial motion unit situated in the first device housing 102 outputs a first orientation determination signal comprising the determined orientation of the first device housing 102, while the inertial motion unit situated in the second device housing 103 outputs another orientation determination signal comprising the determined orientation of the second device housing 103.

In one or more embodiments, the orientation determination signals are delivered to the one or more processors 110, which report the determined orientations to the various modules, components, and applications operating on the electronic device 100. In one or more embodiments, the one or more processors 110 can be configured to deliver a composite orientation that is an average or other combination of the orientation of orientation determination signals. In other embodiments, the one or more processors 110 are configured to deliver one or the other orientation determination signal to the various modules, components, and applications operating on the electronic device 100.

In another embodiment the one or more sensors 115 comprise proximity sensors. The proximity sensors can be used to detect both the geometric form factor and the mechanical support condition of the electronic device 100. Illustrating by example, in one or more embodiments the proximity sensors can detect how far a first end of the electronic device 100 is from a second end of the electronic device 100 to detect the geometric form factor. Coverage locations of the proximity sensors can also be used to determine whether the electronic device 100 is being held or sitting on a table, which allows the one or more processors 110 to determine the mechanical support condition of the electronic device 100 as well.

The proximity sensors can include one or more proximity sensor components. The proximity sensors can also include one or more proximity detector components. In one embodiment, the proximity sensor components comprise only signal receivers. By contrast, the proximity detector components include a signal receiver and a corresponding signal transmitter.

In one embodiment, the proximity sensor components comprise an infrared signal receiver so as to be able to detect infrared emissions from a person. Accordingly, the proximity sensor components require no transmitter since objects disposed external to the electronic device 100 deliver emissions that are received by the infrared receiver. As no transmitter is required, each proximity sensor component can operate at a very low power level.

In one embodiment, one or more proximity detector components can each include a signal receiver and a corresponding signal transmitter. The signal transmitter can transmit a beam of infrared light that reflects from a nearby object and is received by a corresponding signal receiver. The proximity detector components can be used, for example, to compute the distance to any nearby object from characteristics associated with the reflected signals. The reflected signals are detected by the corresponding signal receiver, which may be an infrared photodiode used to detect reflected light emitting diode (LED) light, respond to modulated infrared signals, and/or perform triangulation of received infrared signals.

In one or more embodiments, the one or more sensors 115 can comprise an image capture analysis/synthesis manager. When determining the geometric form factor, and when the electronic device 100 is bent at the hinge 101, with an image capture device 107 situated on the first device housing 102 positioned to a first side of the bend, and image capture device 108 situated on the second device housing 103 positioned to the second side of the bend, the image capture analysis/synthesis manager can detect that the field of view of image capture device 107 and the field of view of image capture device 108 converging or diverging depending upon the angle of the bend, and can determine the geometric form factor by processing images from image capture device 107 and image capture device 108 to determine the angle of the bend.

Similarly, when one or both of the image capture device 107 and/or the image capture device 108 capture an image of a hand grasping the electronic device 100, the image capture analysis/synthesis manager can detect that the mechanical support condition of the electronic device 100 is that of being held. Such images can be used to determine the handedness of the authorized user of the electronic device 100 as well. When images of a table or other flat surface are captured, or when imagers are covered with a direction of gravity passing orthogonally through major faces of one or more of the first device housing 102 and/or the second device housing 103, the image capture analysis/synthesis manager can detect that the mechanical support condition of the electronic device 100 is that of being situated on a table or other flat surface, and so forth.

In one or more embodiments, each of the first image capture device 107 and the second image capture device 108 comprises an intelligent imager. Where configured as an intelligent imager, each image capture device 107,108 can capture one or more images of environments about the electronic device 100 and determine whether the object matches predetermined criteria. This information can be used to determine the mechanical support condition of the electronic device 100. For example, the intelligent imager can operate as an identification module configured with optical recognition such as include image recognition, character recognition, visual recognition, facial recognition, color recognition, shape recognition and the like. This information can be used to determine whether the electronic device 100 is being held or is resting on a surface. It can also be used to determine the handedness of the user as well.

In yet another embodiment, the intelligent imager can determine where a user's eyes or face are located in three-dimensional space relative to the electronic device 100. This information can be combined with the direction of gravity 117 as previously described, can be used to determine whether the electronic device 100 is being held or is sitting on a surface. When the mechanical support condition of the electronic device 100 is that of resting on a surface, the gaze of the user will generally be at a non-orthogonal angle relative to either display 105 or display 120. By contrast, when the electronic device 100 is being held, the gaze of the user will generally be substantially orthogonal with either display 105 or display 120, or within a range of orthogonal, such as between 75 and 105 degrees relative to the surface of the display at which the user's gaze is directed.

The one or more sensors 115 can include a skin sensor configured to determine when the electronic device 100 is touching the skin of a person. This information can be used to determine the mechanical support condition of the electronic device 100. Where the skin is touching the electronic device 100 can be used to determine the handedness of the user as well. For example, in one or more embodiments the skin sensor can determine when the electronic device 100 is being held within the hand of a user. In one embodiment, the skin sensor can include a substrate with an electrode disposed thereon. The electrode can confirm the object touching the skin sensor is skin by detecting electrical signals generated by a heartbeat in one embodiment. Other forms of skin sensors will be obvious to those of ordinary skill in the art having the benefit of this disclosure.

The one or more sensors 115 can include a light sensor. The light sensor can be used to detect whether or not direct light is incident on one or both of the first device housing 102 or the second device housing 103 in one or more embodiments. The light sensor can also be used to detect an intensity of ambient light is above or below a predefined threshold in one or more embodiments.

In one or more embodiments the light sensor can detect changes in optical intensity, color, light, or shadow in the near vicinity of the electronic device 100. This can be used to make inferences about whether the electronic device 100 is being held or is sitting on a surface. In one embodiment, the light sensor can be configured as an image-sensing device that captures successive images about the device and compares luminous intensity, color, or other spatial variations between images to detect weather conditions.

The one or more sensors 115 can include a temperature sensor configured to monitor the temperature of the environment. Temperature gradients along the surfaces of the electronic device 100 can be used to detect not only the mechanical support condition of the electronic device, but the handedness of the user as well. The temperature sensor can take various forms. In one embodiment, the temperature sensor is simply a proximity sensor component. In another embodiment, the temperature sensor comprises a simple thermopile. In another embodiment, the temperature sensor comprises an infrared imager that captures the amount of thermal energy emitted by an object. Other types of temperature sensors will be obvious to those of ordinary skill in the art having the benefit of this disclosure.

The one or more sensors 115 can include a force sensor. The force sensor can be used to determine that the mechanical support condition of the electronic device 100 is that of being held by a user. It can also be used to determine where the electronic device 100 is being grasped for the purposes of determining the handedness of the user. The force sensor can take various forms. For example, in one embodiment, the force sensor comprises resistive switches or a force switch array configured to detect contact with one or both of display 105 or display 120, or one or both of the first device housing 102 or the second device housing 103 of the electronic device. In another embodiment, the force sensor can include a capacitive sensor. In yet another embodiment, piezoelectric sensors can be configured to sense force as well. Other types of force sensors will be obvious to those of ordinary skill in the art having the benefit of this disclosure.

The one or more sensors 115 can include one or more motion sensors. The one or more motion sensors can include one or more accelerometers or gyroscopes. For example, an accelerometer may be embedded in the electronic circuitry of the electronic device 100 to show vertical orientation, constant tilt and/or whether the electronic device 100 is stationary. A gyroscope can be used in a similar fashion. Motion of the electronic device 100 indicates a mechanical support condition of being held, while an absence of motion may indicate the mechanical support condition of the electronic device 100 that of being stationary on a table or other surface. The one or more motion sensors can also include an electronic compass to detect the spatial orientation of the electronic device 100 relative to the earth's magnetic field.

The one or more sensors 115 can also include one or more microphones operable to receive acoustic input. While the one or more microphones can be used to sense voice input, voice commands, and other audio input, in one or more embodiments they can also be used as environmental sensors to sense environmental sounds such as the electronic device 100 being placed on a table, the sound of skin moving across the first device housing 102, the hinge 101, or the second device housing 103, or the rumpling of soft surfaces of textile materials or other similar materials encapsulating the electronic device 100 when the electronic device 100 is in a pocket, for example. Alternatively, the one or more microphones can be used to detect the nearby presence of items to determine the mechanical support condition of the electronic device 100.

The one or more sensors 115 can also include a moisture sensor. The moisture sensor 207 can be configured to detect the amount of moisture on or about display 105 or display 120, or the amount of moisture present on the first device housing 102 or the second device housing 103. Perspiration detection can be used to determine both the mechanical support condition of the electronic device 100 and the handedness of the user as well. The moisture sensor can be realized in the form of an impedance sensor that measures impedance between electrodes. Other types of moisture sensors will be obvious to those of ordinary skill in the art having the benefit of this disclosure.

The one or more sensors 115 can include a distance measurement sensor. The distance measurement sensor can take various forms. In one or more embodiments, the distance measurement sensor comprises a time-of-flight depth imager. In another embodiment, the distance measurement sensor can comprise a radar device. In still another embodiment, the distance measurement sensor can comprise a sonar device. In yet another embodiment, the distance measurement sensor can comprise an ultrasound distance measurement device.

Regardless of type, in one or more embodiments the distance measurement sensor can perform distance determination operations. For example, the distance measurement sensor can measure distances between objects situated within the environment of the electronic device 100 in one or more embodiments. This information can be used to determine the mechanical support condition. In other embodiments, the distance measurement sensor can determine changes in distances between the electronic device 100 and objects situated within the environment. Combinations of these operations can be performed as well.

The electronic device 100 can include other components 119 as well. The other components 119 may include an earpiece speaker, a loudspeaker, key selection sensors, a touch pad sensor, a touch screen sensor, a capacitive touch sensor, and one or more switches. Touch sensors may be used to indicate whether any of the user actuation targets present on the first display 105 are being actuated. Alternatively, touch sensors can determine if the second display 120 is being touched to determine whether fingerprint data is being delivered to the fingerprint sensor 106. The touch sensors can include surface and/or housing capacitive sensors in one embodiment.

The other components 119 operable with the one or more processors 110 can include output components such as video outputs, audio outputs, and/or mechanical outputs. Examples of output components include audio outputs, haptic devices, or other alarms and/or buzzers and/or a mechanical output component such as vibrating or motion-based mechanisms. Still other components will be obvious to those of ordinary skill in the art having the benefit of this disclosure.

It is to be understood that FIG. 1 is provided for illustrative purposes only and for illustrating components of one electronic device 100 in accordance with embodiments of the disclosure and is not intended to be a complete schematic diagram of the various components required for an electronic device. Therefore, other electronic devices in accordance with embodiments of the disclosure may include various other components not shown in FIG. 1 or may include a combination of two or more components or a division of a particular component into two or more separate components, and still be within the scope of the present disclosure.

Figure 2:
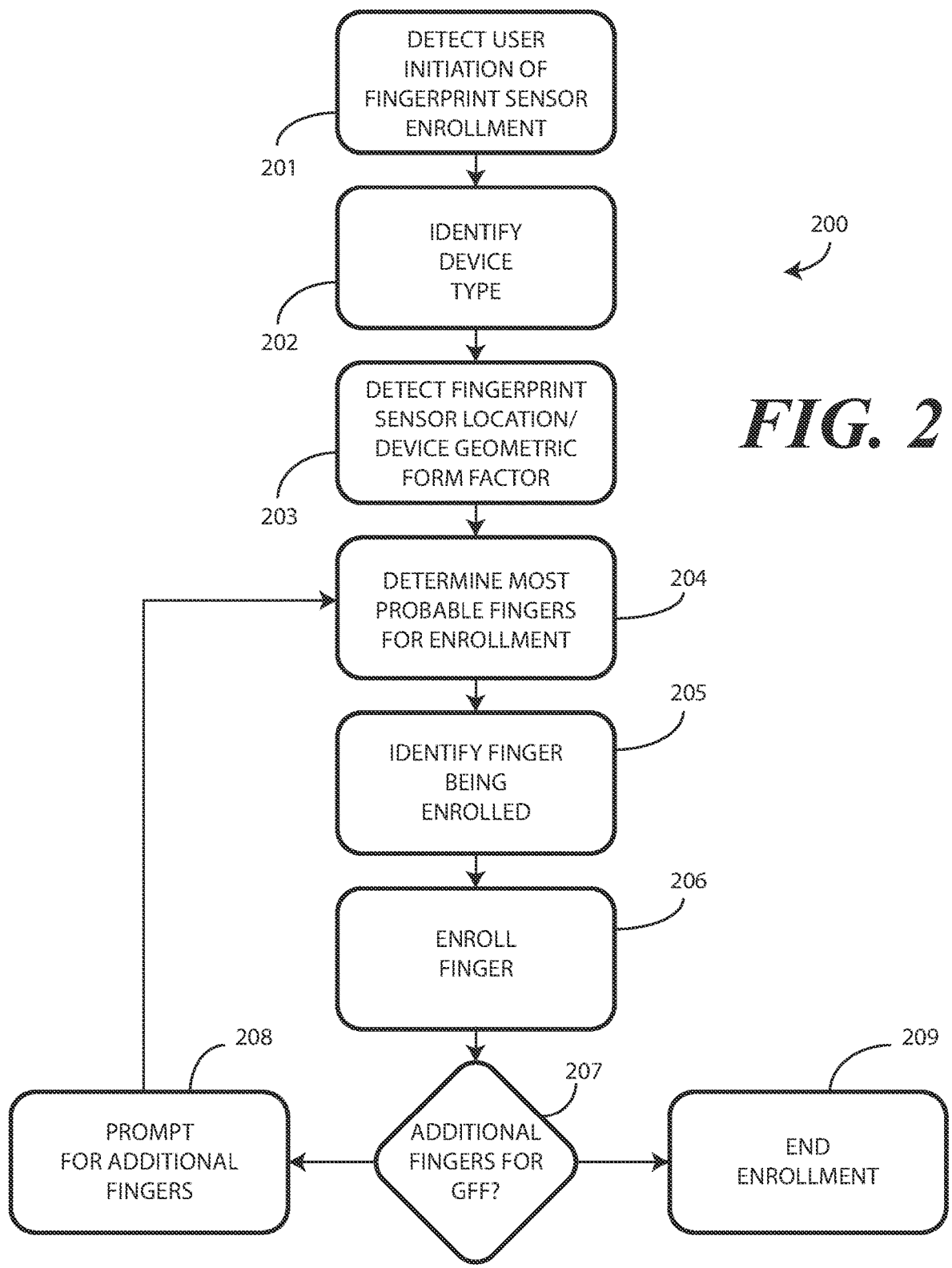
FIG. 2 illustrates one explanatory method in accordance with one or more embodiments of the disclosure.

Now that the various hardware components have been described, attention will be turned to methods, systems, and use cases in accordance with one or more embodiments of the disclosure. Beginning with FIG. 2, illustrated therein is one explanatory method 200 for enrolling fingerprint data as one or more fingerprint reference data files stored within a memory of an electronic device in accordance with one or more embodiments of the disclosure. In one or more embodiments, the method 200 of FIG. 2 allows for the completion of an enrollment process receiving reference fingerprint data at a fingerprint sensor of the electronic device, where that reference fingerprint data corresponds to at least two fingers of the authorized user most likely to be used in conditions of the electronic device that are most likely to occur during usage. The method 200 of FIG. 2 stores the reference fingerprint data as two or more fingerprint reference data file in the memory of the electronic device.

The method 200 of FIG. 2 is the "learning" process that allows embodiments of the disclosure provide faster and more efficient methods for authenticating an authorized user of an electronic device using a fingerprint sensor based upon a mechanical support condition of the electronic device when fingerprint data is received. Additionally, the method 200 of FIG. 2 ensures that prioritized or preferred fingerprint data is enrolled and stored as fingerprint reference data files in a memory of the electronic device during the initial enrollment process. The method 200 enrolls fingerprint data corresponding to at least two fingers of an authorized user of the electronic device by storing, with one or more processors, the fingerprint data as at least two fingerprint reference data files in the memory of the electronic device.

At step 201, the method 200 for enrolling fingerprint data as one or more fingerprint reference data files includes determining that an authorized user of the electronic device is initiating a fingerprint sensor enrollment sequence. In one or more embodiments, the authorized user may first be required to identify himself or herself as the authorized user by entering an authentication credential at step 201. The one or more processors may prompt for the authorized user to enter a passcode at step 201 for example. Other techniques allowing for the authorized user to initially identify himself or herself as the authorized user of the electronic device will be obvious to those of ordinary skill in the art having the benefit of this disclosure.

At step 202, one or more processors of the electronic device determine a device category of the electronic device. In one embodiment, the device category is that the electronic device is a clamshell device. In another embodiment, the device category is that the electronic device is a candy bar device. Other device categories, including pivoting devices, sliding devices, bending devices, and rotating devices will be obvious to those of ordinary skill in the art having the benefit of this disclosure.

In one or more embodiments, step 203 includes one or more processors of the electronic device then determine a device configuration of the electronic device, which may include determining whether the electronic device has a single display or multiple displays. Step 203 can also include detecting other hardware configurates of the electronic device, such as where the fingerprint sensor is situated on the electronic device, e.g., on the rear surface of the electronic device, under a display of the electronic device, on a minor surface of the electronic device or elsewhere.

At step 204, one or more processors of the electronic device identify at least two fingerprint reference data file types as a function of the information identified at step 202 and step 203. In one or more embodiments, step 204 comprises the one or more processors of the electronic device initially identifying the at least two fingerprint reference data file types as a function of the device category determined at step 202 and the location of the fingerprint sensor determined at step 203. As will be described below, other information can be determined, such as the handedness of the user, which can allow the one or more processors to identify the at least two fingerprint reference data file types as a function of the device category, the fingerprint sensor location, and the handedness of the authorized user of the electronic device as well. Other factors for selecting the at least two fingerprint reference data file types will be obvious to those of ordinary skill in the art having the benefit of this disclosure.

At step 205, one or more processors of the electronic device detect enrollment of fingerprint data as a fingerprint reference data file when fingerprint data is received by the fingerprint sensor. In one or more embodiments, the authorized user of the electronic device completes the enrollment process shown in FIG. 2 by delivering fingerprint data to the fingerprint sensor so that the fingerprint data can be captured and stored as one or more fingerprint reference data files in the memory of the electronic device. As explained below, in one or more embodiments the authorized user enrolls fingerprint data corresponding to at least two fingers when step 206 is repeated in response to the output of decision 207.

Illustrating by example, the authorized user may first enroll a forefinger due to the fact that the forefinger is well positioned to deliver fingerprint data to the fingerprint sensor when the electronic device is in the axially displaced open position shown in FIG. 1 above. The authorized user may then enroll fingerprint data from a second finger, such as a thumb, because the thumb can conveniently be used when the electronic device is in the closed position of FIGS. 7-8 below when the authorized user is holding the electronic device with their fingers supporting the second device housing with their thumb placed on the first device housing. Additional fingers can be enrolled at step 206 as well.

In one or more embodiments, the one or more processors can prompt the user for a specific sequence of finger taps, rolls, and movements along the fingerprint sensor at step 205 to ensure the proper fingerprint data of sufficient quality is received. Accordingly, in one or more embodiments, step 205 can include the one or more processors navigating the authorized user through the enrollment process. The one or more processors may present a series of prompts informing the authorized user how to enroll the fingerprint data at step 205. This may include the one or more processors presenting a message instructing the authorized user to first find the fingerprint sensor, which may be situated beneath a display. When the authorized user locates the fingerprint sensor, in one or more embodiments the one or more processors present a verification notification at step 205.

At step 205, the one or more processors may also request that the authorized user place their finger atop a location of the exterior display multiple times so that a sufficient amount of fingerprint data is captured to be used as a fingerprint reference data file. Accordingly, the one or more processors may present a prompt instructing the authorized user to lift their finger and then again touch the location of the exterior display situated atop the fingerprint sensor multiple times at step 205. The one or more processors may request that the authorized user move their finger slightly at step 205.

Step 205 can also include identifying which finger is being enrolled and the handedness of a user as well. Illustrating by example, in one or more embodiments step 205 can include capturing one or more images with an image capture device of the electronic device to determine which finger is being used to deliver the fingerprint data. The one or more images can also be used to determine whether the authorized user is using a right hand or a left hand to perform the fingerprint enrollment process.

From this information, the one or more processors of the electronic device ascertain the handedness of the person in one or more embodiments at step 205. It would be unlikely, for example, that an authorized user of an electronic device would initially use a left hand for fingerprint enrollment when they are righthanded, and vice versa. Accordingly, in one or more embodiments the one or more processors can use information from an imager or other sensor at step 205 to determine a handedness of the user. The imager or other sensors can also be used to determine which finger the user is attempting to enroll as well. The fingerprint data is stored as a fingerprint reference data file in the memory of the electronic device at step 206.

Decision 207 then determines whether additional fingers need to be enrolled. Since the step 204 initially identified at least two fingerprint reference data file types as a function of the device category and the fingerprint sensor location, and as only one finger has been enrolled to this point, the method 200 moves to step 208 where the one or more processors of the electronic device prompt for at least one other finger to be enrolled. Thus, to ensure that both of the at least two fingerprint reference data file types are enrolled, step 208 comprises the one or more processors prompting, at a user interface of the electronic device, for enrollment of at least one other fingerprint reference data file type of the at least to fingerprint reference data file types before terminating the enrolling process.

The method 200 then returns to step 204. In one or more embodiments, after determining the device category of the electronic device (step 202), a fingerprint sensor location of the fingerprint sensor (step 203), and a handedness of the authorized user (step 205), the one or more processors identify at least two fingerprint reference data file types at step 204 as a function of these factors. For example, the one or more processors may identify a right thumb and index finger as at least two fingerprint reference data file types as a function of the device category, the fingerprint sensor location, and the handedness of the authorized user.

The one or more processors then detect enrollment of a second fingerprint reference data file type of the at least two fingerprint reference data file types at step 205, with this second fingerprint reference data file type being stored as a fingerprint reference data file at step 206. Once all requisite fingerprint reference data file types are enrolled, the method 200 ends at step 209. Once the enrollment process is complete, another verification notification may be presented informing the authorized user of the same at step 209. While the method 200 of FIG. 2 provides one illustrative technique for enrolling fingerprint reference data file types, other techniques for performing an enrollment process will be obvious to those of ordinary skill in the art having the benefit of this disclosure.

Figures 3, 4:
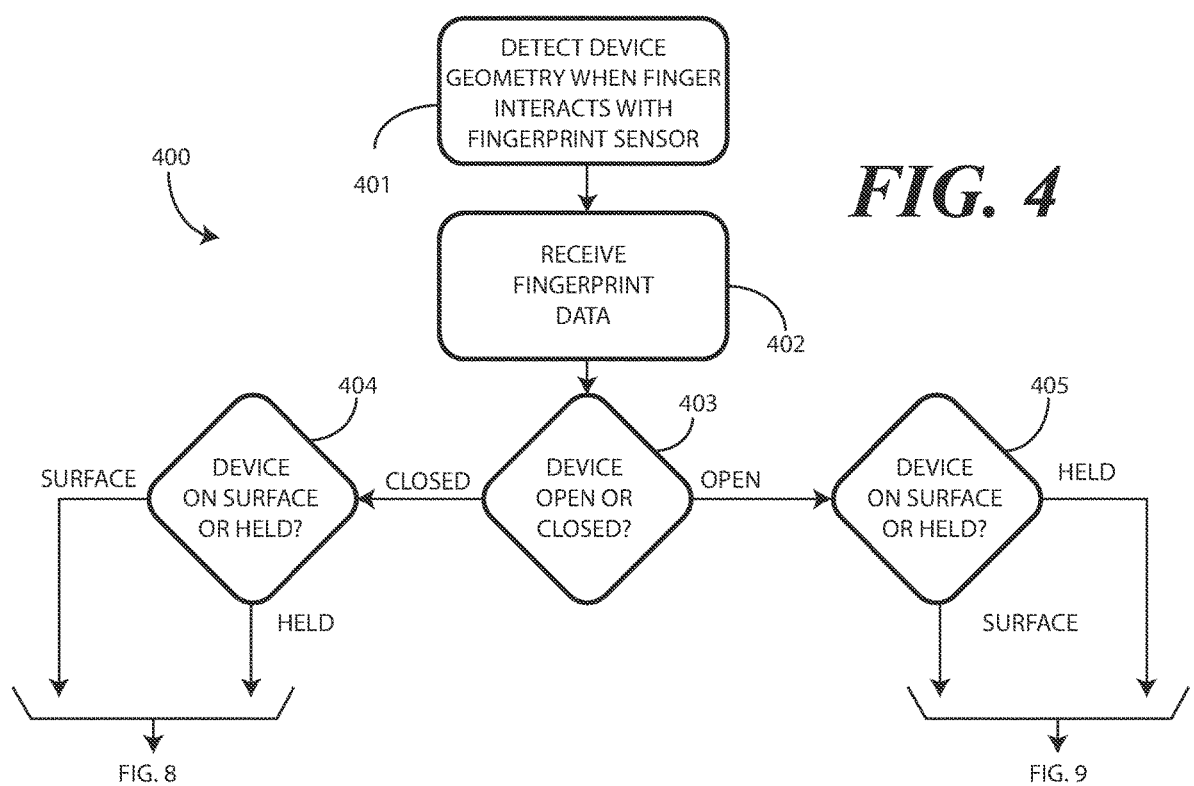
FIG. 3 illustrates one or more preselected fingerprint reference data files selected as a function of a mechanical support condition of an electronic device in accordance with one or more embodiments of the disclosure.
FIG. 4 illustrates one explanatory method in accordance with one or more embodiments of the disclosure.

Thereafter, the fingerprint reference data files can be prioritized to make unlocking the electronic device faster, more seamless, and more efficient. In one or more embodiments, the fingerprint reference data files are prioritized as a function of the geometric form factor of the electronic device and/or the mechanical support condition of the electronic device. Turning now to FIG. 3, illustrated therein is one table 300 of prioritized fingerprint reference data file types 301 as a function of geometric form factor 303 and a mechanical support condition 302 in accordance with one or more embodiments of the disclosure.

When the geometric form factor 303 comprises the first device housing and second device housing of the electronic device being in the closed position, and the mechanical support condition 302 comprises the electronic device being supported by a surface such as a table, there is no prioritized fingerprint reference data file type. This is the case because an authorized user of the electronic device is equally likely to use a thumb or forefinger to unlock the electronic device, with the latter being illustrated in FIG. 7 below. This presumes, of course, that the electronic device is being supported by the surface with the fingerprint sensor facing upward. If the electronic device is turned over with the fingerprint sensor situated between the electronic device and the surface, the fingerprint sensor would not be accessible until the electronic device is transitioned to a hand-supported mechanical support condition and turned over.

When the geometric form factor 303 comprises the first device housing and second device housing of the electronic device being in the closed position, and the mechanical support condition 302 comprises the electronic device being in a held condition due to the authorized user of the electronic device holding the electronic device in their hand, in one or more embodiments the prioritized fingerprint reference data file type is a thumb fingerprint reference data file type. This is the case because it is most often the case that the authorized user will use their fingers to support the electronic device against the direction of gravity, with their thumb positioned atop the exterior display as shown below in FIG. 8.

When the geometric form factor 303 comprises the first device housing and second device housing of the electronic device being pivoted to the axially displaced open position, and the mechanical support condition 302 comprises the electronic device being supported by a surface such as a table with the fingerprint sensor oriented upward so as to be accessible, there is no prioritized fingerprint reference data file type. This is the case because an authorized user of the electronic device is equally likely to use a thumb or forefinger to unlock the electronic device, with the latter being illustrated in FIG. 9 below. As with the closed, surface-supported mechanical support condition, this presumes that the electronic device is being supported by the surface with the fingerprint sensor facing upward. If the electronic device is turned over with the fingerprint sensor situated between the electronic device and the surface, the fingerprint sensor would not be accessible until the electronic device is transitioned to a hand-supported mechanical support condition and turned over.

When the geometric form factor 303 comprises the first device housing and second device housing of the electronic device being pivoted to the axially displaced open position, and the mechanical support condition 302 comprises the electronic device being in a held condition due to the authorized user of the electronic device holding the electronic device in their hand, in one or more embodiments the prioritized fingerprint reference data file type is a forefinger fingerprint reference data file type. This is the case because it is most often the case that the authorized user will use their thumb and other fingers to grasp the minor surfaces of the electronic device, with their forefinger positioned atop the exterior display as shown below in FIG. 9.

Accordingly, when the fingerprint sensor receives the fingerprint data while the electronic device is in the detected mechanical support condition and/or at least one other condition, such as a geometric form factor, the one or more processors select one fingerprint reference data file from the at least two fingerprint reference data files as a function of these conditions. Thereafter, the one or more processors authenticate the authorized user of the electronic device by comparing the received fingerprint data to the selected fingerprint reference data file before comparing the fingerprint data to any other fingerprint reference data file stored in the memory.

Thus, the one or more processors can advantageously anticipate that the authorized user will used, for instance, an index finger to authenticate themselves based upon the geometric form factor and the mechanical support condition and compare the fingerprint data to the index finger fingerprint reference data file before comparing the fingerprint data to the thumb fingerprint reference data file in one or more embodiments. This streamlines the authentication process, which makes unlocking the electronic device faster and more efficient. When combined with the enrollment process that ensures that all likely fingers that will be used in the most likely mechanical support conditions and geometric form factors are enrolled, embodiments of the disclosure allow a user to more quickly unlock an electronic device. Embodiments of the disclosure also save power and processor cycles as well. Turning now to FIG. 4, illustrated therein is one explanatory method 400 by which this can occur.

The method 400 of FIG. 4 prioritizes a particular finger when authenticating an authorized user of the electronic device as a function of the mechanical support condition of the electronic device. The method 400 can additionally prioritize a particular finger as a function of additional factors, including the geometric form factor of the electronic device, the handedness of the user, or other factors. While multiple fingers can be used for authentication regardless of the mechanical support condition of the electronic device, the geometric form factor of the electronic device, or the handedness of the user, prioritizing a particular finger as a function of these conditions advantageously saves processor cycles in the authentication process to provide a more instantaneous authentication operation.

Beginning at step 401, one or more processors of an electronic device detect, using one or more sensors, a mechanical support condition of the electronic device. In one or more embodiments, step 401 comprises determining whether the mechanical support condition comprises a hand supported condition occurring when the electronic device is being held by a user, or when the mechanical support condition is a surface supported condition such as when the electronic device is resting on a surface such as a counter, table, upon a surface in a car, or on a piece of furniture. Other mechanical support conditions can be determined as well, such as when the electronic device is in a stowed state, which is a condition the electronic device may experience when situated in a purse, pocket, or drawer.

This mechanical support condition can be determined at step 401 in a variety of ways, including those described above with reference to FIG. 1. Illustrating by example, if one or more motion sensors detect an absence of motion while a gravity detector detects the direction of gravity passing substantially orthogonally through major surfaces of the electronic device, the one or more processors may conclude that the electronic device is resting upon a horizontal surface. By contrast, if the one or more motion sensors detect that the electronic device is moving while a touch sensor detects touch along the housings of the electronic device, the one or more processors may conclude that the electronic device is being held, and so forth.

In one or more embodiments, step 401 also comprises determining a geometric form factor of the electronic device. Where, for example, the electronic device comprises a first device housing that is pivotable relative to a second device housing between a closed position and an axially displaced open position, flex sensors, inertial motion units, magnetic sensors, imagers, or other sensors can determine whether the electronic device is in the closed position, the axially displaced open position, or somewhere in between at step 401.

At step 402, a fingerprint sensor of the electronic device receives fingerprint data. In one or more embodiments, the fingerprint sensor is situated beneath a display of the electronic device. In one or more embodiments, the fingerprint data received at step 402 is received while the electronic device is in the mechanical support condition and geometric form factor determined at step 401.

Decision 403 then determines whether the electronic device is in the axially displaced open position or the closed position. If the former, the method 400 moves to decision 405. If the latter, the method 400 moves to decision 404.

In the illustrative example of FIG. 4, decision 404 determines whether the mechanical support condition of the electronic device is a surface supported condition or a hand supported condition. In other embodiments, decision 404 can include other possible conditions, including stowed conditions, in-pocket conditions, and so forth. However, for brevity, the two mechanical support conditions of a surface supported condition and a hand supported condition are used for illustration purposes. It will be obvious to those of ordinary skill in the art having the benefit of this disclosure how the method 400 of FIG. 4 could be extended to additional conditions based upon this explanatory illustration. Additional method steps following decision 404 are described in FIG. 5 below.

Decision 405 effectively makes the same determination as decision 404, i.e., whether the mechanical support condition is a surface supported condition or a hand supported condition, but when the electronic device is in the axially displaced open position rather than the closed position. Additional method steps following decision 405 are described in FIG. 6 below.

Figure 5:
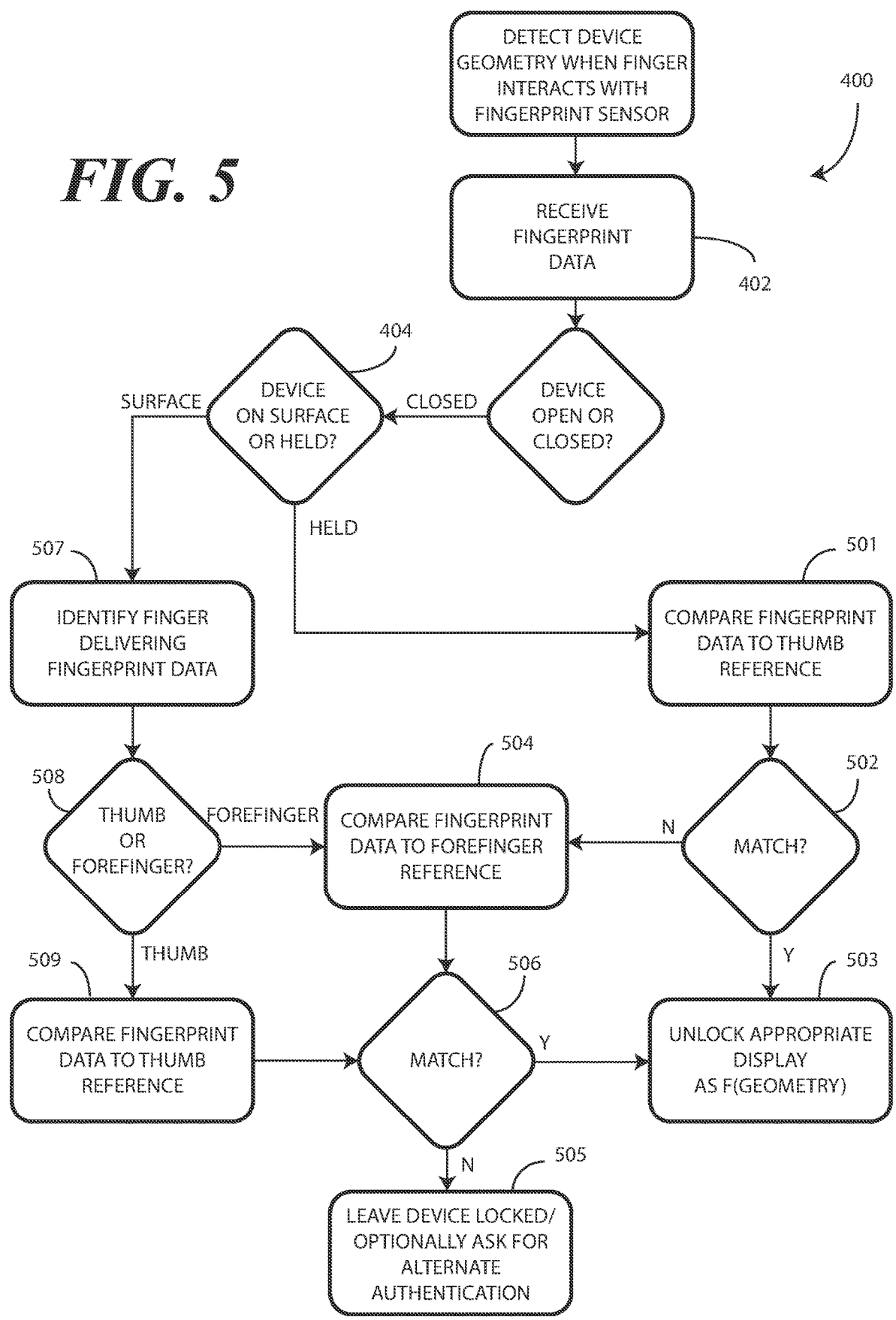
FIG. 5 illustrates another explanatory method in accordance with one or more embodiments of the disclosure.
Figure 6:
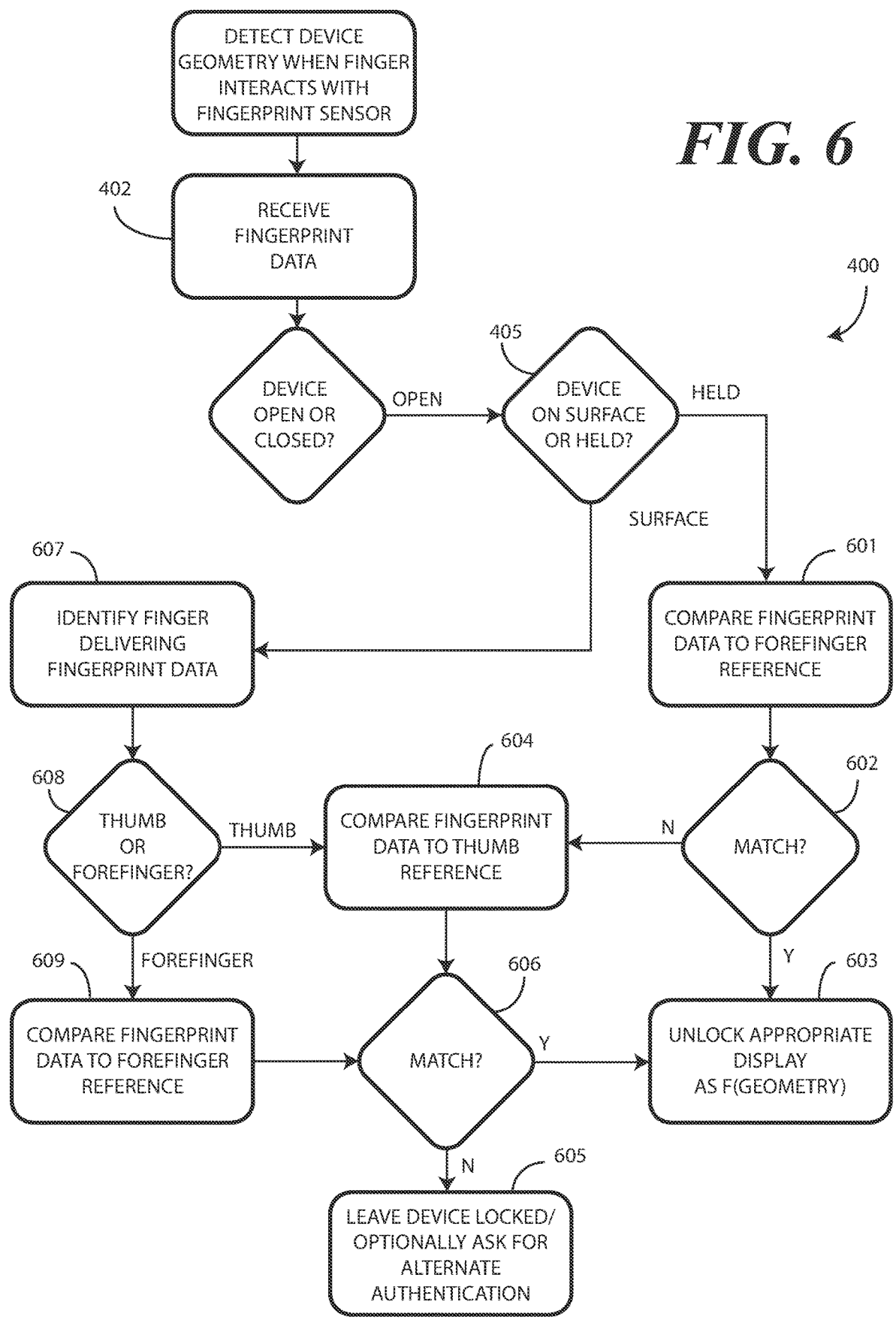
FIG. 6 illustrates yet another explanatory method in accordance with one or more embodiments of the disclosure.

FIGS. 5 and 6 illustrate how one or more processors can select a preselected fingerprint reference data file to which the fingerprint data will be compared before comparing the fingerprint data to any other fingerprint reference data file stored in a memory of the electronic device. In one or more embodiments, this preselected fingerprint reference data file is selected as a function of the mechanical support condition and the geometric form factor, as will be illustrated in FIGS. 5 and 6.

Beginning with FIG. 5, when decision 404 determines that the mechanical support condition is a hand supported condition while the geometric form factor of the electronic device is in the closed position, the method 400 moves to step 501. At step 501, the one or more processors of the electronic device select a preselected fingerprint reference data file as a function of this mechanical support condition and geometric form factor. In one or more embodiments, the preselected fingerprint reference data file comprises a thumb fingerprint reference data file.

Since the authorized user enrolled at least two fingers using the method (200) of FIG. 2, the memory of the electronic device stores a plurality of fingerprint reference data files. Illustrating by example, if the authorized user enrolls the thumb and forefinger in the method of FIG. 2, the memory will store a forefinger fingerprint reference data file and a thumb fingerprint reference data file. If the authorized user enrolls additional fingers, the memory will store additional fingerprint reference data files, and so forth. The selection occurring at step 501 makes a selection of one fingerprint reference data file from this plurality of fingerprint reference data files as a function of the mechanical support condition and the geometric form factor in one or more embodiments.

At step 501, the one or more processors then compare the fingerprint data received at step 402 with the thumb fingerprint reference data file before comparing the fingerprint data to any other fingerprint reference data file stored in the memory of the electronic device. In one or more embodiments, step 501 comprises the one or more processors prioritizing the thumb fingerprint data by comparing the fingerprint data received at step 402 with the thumb fingerprint data reference file stored in the memory of the electronic device before comparing the fingerprint data to any other fingerprint reference data files stored in the memory whenever the first device housing and the second device housing are the closed position and the electronic device is being held.

If the fingerprint data substantially matches the thumb fingerprint reference data file, as determined at decision 502, the one or more processors authenticate the user delivering the fingerprint data at step 502 as the authorized user of the electronic device and unlock the electronic device in response to authenticating the authorized user of the electronic device at step 503. In one or more embodiments, this occurs when the fingerprint sensor situated beneath the exterior display receives the fingerprint data while the first device housing and the second device housing are in the closed position and the electronic device is being held by the user. Otherwise, the method 400 moves to step 504 where additional fingerprint reference data files are compared to the fingerprint data until a match is determined at decision 505. If no match is ever made, the electronic device and its displays remain locked at step 506. The one or more processors can optionally prompt for an alternate authentication credential at step 506, such as a password, personal identification number, or other credential, in one or more embodiments.

In contrast to this prioritization of the thumb occurring when the electronic device is in the closed position and is being held, when the mechanical support condition is a surface supported condition and the electronic device is in the closed position multiple fingers can equally be used to authenticate the authorized user. While this is ultimately true as well in hand supported mechanical support condition, the left side of the method 400 of FIG. 5 uses additional processor cycles, thereby making it slower than the right side of the method 400 of FIG. 5.

Specifically, when the electronic device is in the closed position and the mechanical support condition comprises a surface supported condition, an additional step of identifying the type of fingerprint data occurs at step 507. The one or more processors analyze the fingerprint data to determine which finger provided the same at decision 508. Using a thumb and forefinger as an illustrative example, if decision 508 determines the finger supplying the fingerprint data is a thumb, this fingerprint data is compared to a thumb fingerprint reference data file at step 509 to determine if it substantially matches the same. By contrast, if the if decision 508 determines the finger supplying the fingerprint data is a forefinger, this fingerprint data is compared to a forefinger fingerprint reference data file at step 504 to determine if it substantially matches the same. If a match is made, the exterior display is unlocked at step 503. If no match is ever made, the electronic device and its displays remain locked at step 506. The one or more processors can optionally prompt for an alternate authentication credential at step 506 in one or more embodiments as previously noted.

Accordingly, to streamline and make the process of user authentication more efficient, the method 400 of FIGS. 4-5 authenticates the authorized user of the electronic device by comparing the fingerprint data to a thumb fingerprint reference data file before any other fingerprint reference data files when the geometric form factor of the electronic device is the closed position and the mechanical support condition of the electronic device is a held condition. By contrast, an additional determination of which finger is being used occurs when the geometric form factor of the electronic device is the closed position and the mechanical support condition is a surface supported condition in one or more embodiments due to the fact that the difference between the probability of the authorized user using a thumb or forefinger (or another finger) is smaller when the electronic device is in the closed position and is surface supported than when the electronic device is in the closed position and is hand supported.

In other embodiments, the method 400 can be altered based upon learned usage of the fingerprint sensor and the electronic device. If, for example, a user repeatedly uses a forefinger to unlock the electronic device when the electronic device is in the closed position and in a surface supported mechanical support condition, step 507 and decision 508 can be removed from the method 400 of FIG. 5 with step 507 being replaced by a variant of step 501 and decision 508 being replaced with decision 502 when a preselected fingerprint reference data file is chosen for the surface supported, closed position electronic device.

Illustrating by example, in one or more embodiments when the mechanical support condition comprises a surface supported condition and the geometric form factor comprises the first device housing being pivoted relative to the second device housing to the closed position, step 507 can be replaced with a variant of step 501 in which the one or more processors select a forefinger fingerprint reference data file and compare the fingerprint data received at step 402 to the forefinger fingerprint reference data file before comparing the fingerprint data to any other fingerprint reference data files stored in the memory of the electronic device. When decision 508 is replaced with decision 502, the one or more processors can determine whether there is a match. Where there is, the method 400 can proceed to step 503 where the electronic device is unlocked in response to the fingerprint data authenticating the user as an authorized user of the electronic device. By contrast, when there is not a match, the method 400 can proceed to step 509 as previously described.

The same process can occur when the user tends to use a thumb to unlock the electronic device when the electronic device is in the closed position and the mechanical support condition is a surface supported condition. In this condition, step 507 can be replaced with step 501 in which the one or more processors select a thumb fingerprint reference data file and compare the fingerprint data received at step 402 to the thumb fingerprint reference data file before comparing the fingerprint data to any other fingerprint reference data files stored in the memory of the electronic device. When decision 508 is replaced with decision 502, the one or more processors can determine whether there is a match. Where there is, the method 400 can proceed to step 503 where the electronic device is unlocked in response to the fingerprint data authenticating the user as an authorized user of the electronic device. By contrast, when there is not a match, the method 400 can proceed to step 504 as previously described.

Accordingly, the methods of FIGS. 4-5 illustrate the steps of detecting a mechanical support condition of the electronic device with one or more sensors, receiving fingerprint data with a fingerprint sensor of the electronic device, and authenticating an authorized user of the electronic device with one or more processors by comparing the fingerprint data to a preselected fingerprint reference data file, stored in a memory of the electronic device and selected as a function of the mechanical support condition and geometric form factor, before comparing the fingerprint data to any other fingerprint reference data files stored in the memory. When the fingerprint data authenticates the person delivering the fingerprint data to the fingerprint sensor, the one or more processors can unlock the electronic device.

In one or more embodiments, when the mechanical support condition comprises a hand supported condition, and the geometric form factor is the closed position, the preselected fingerprint reference data file comprises a thumb reference data file. In one or more embodiments, when the mechanical support condition comprises a surface supported condition, and the geometric form factor is the closed position, extra steps can be taken to determine which finger is delivering the fingerprint data before any comparison or selection of a fingerprint reference data file is made. However, in other situations, such as when the user defines preferred fingers using one or more user settings of the electronic device, or where the one or more processors determine a consistent and repeated usage pattern in which one finger is preferred for the closed position and surface supported condition, the method 400 of FIGS. 4-5 allows for the preselection of a fingerprint reference data file as well. To this point, in one or more embodiments when the mechanical support condition comprises a surface supported condition and the geometric form factor comprises the closed position, the preselected fingerprint reference data file comprises a forefinger fingerprint reference data file. However, in other embodiments when the mechanical support condition comprises the surface supported condition and the geometric form factor comprises the closed position, the preselected fingerprint reference data file comprises a thumb reference data file. Other optional configurations for the method 400 of FIG. 4 will be obvious to those of ordinary skill in the art having the benefit of this disclosure.

Turning now to FIG. 6, illustrated therein is the corollary of the method 400 of FIG. 5 that occurs when the geometric form factor comprises the first device housing being pivoted relative to the second device housing to the axially displaced open position. In one or more embodiments, when decision 405 determines that the mechanical support condition is a hand supported condition while the geometric form factor of the electronic device is the axially displaced open position, the method 400 moves to step 601. At step 601, the one or more processors of the electronic device select a preselected fingerprint reference data file as a function of this mechanical support condition and geometric form factor. In one or more embodiments, the preselected fingerprint reference data file comprises a forefinger fingerprint reference data file.

At step 601, the one or more processors then compare the fingerprint data received at step 402 with the forefinger fingerprint reference data file before comparing the fingerprint data to any other fingerprint reference data file stored in the memory of the electronic device. If the fingerprint data substantially matches the forefinger fingerprint reference data file, as determined at decision 602, the one or more processors authenticate the user delivering the fingerprint data at step 402 as the authorized user of the electronic device and unlock the electronic device in response to authenticating the authorized user of the electronic device at step 603. Otherwise, the method 400 moves to step 604 where additional fingerprint reference data files are compared to the fingerprint data until a match is determined at decision 605. If no match is ever made, the electronic device and its displays remain locked at step 606. The one or more processors can optionally prompt for an alternate authentication credential at step 606 in one or more embodiments.

In contrast to this prioritization of the forefinger occurring when the electronic device is in the axially displaced open position and is being held, when the mechanical support condition is a surface supported condition and the electronic device is in the axially displaced open position multiple fingers can equally be used to authenticate the authorized user. In one or more embodiments, the left side of the method 400 of FIG. 6 uses additional processor cycles, thereby making it slower than the right side of the method 400 of FIG. 6.

In one or more embodiments, when the electronic device is in the axially displaced open position and the mechanical support condition comprises a surface supported condition, an additional step of identifying the type of fingerprint data occurs at step 607. The one or more processors analyze the fingerprint data to determine which finger provided the same at decision 608. Using a thumb and forefinger as an illustrative example, if decision 608 determines the finger supplying the fingerprint data is a thumb, this fingerprint data is compared to a thumb fingerprint reference data file at step 604 to determine if it substantially matches the same. By contrast, if the if decision 608 determines the finger supplying the fingerprint data is a forefinger, this fingerprint data is compared to a forefinger fingerprint reference data file at step 609 to determine if it substantially matches the same. If a match is made, the exterior display is unlocked at step 603. If no match is ever made, the electronic device and its displays remain locked at step 606. The one or more processors can optionally prompt for an alternate authentication credential at step 606 in one or more embodiments as previously noted.

Accordingly, to streamline and make the process of user authentication more efficient, the method 400 of FIGS. 4 and 6 authenticates the authorized user of the electronic device by comparing the fingerprint data to a forefinger fingerprint reference data file before any other fingerprint reference data files when the geometric form factor of the electronic device is the axially displaced open position and the mechanical support condition of the electronic device is a held condition. By contrast, an additional determination of which finger is being used occurs when the geometric form factor of the electronic device is the axially displaced open position and the mechanical support condition is a surface supported condition in one or more embodiments due to the fact that the difference between the probability of the authorized user using a thumb or forefinger (or another finger) is smaller when the electronic device is in the axially displaced open position and is surface supported than when the electronic device is in the axially displaced open position and is hand supported. The right side of the method 400 of FIG. 6 presumes that the fingerprint sensor is facing upward when in the surface supported mechanical support condition, as it is not possible to access the fingerprint sensor otherwise unless the electronic device is first transitioned from the surface supported condition to the hand supported condition.

As with the portions of the method 400 shown in FIG. 4, in other embodiments the portions of method 400 of FIG. 6 can be altered based upon learned usage of the fingerprint sensor and the electronic device, user settings, or other inputs. If, for example, a user repeatedly uses a forefinger to unlock the electronic device when the electronic device is in the axially displaced open position and in a surface supported mechanical support condition, step 607 and decision 608 can be removed from the method 400 of FIG. 6 with step 607 being replaced by step 601 and decision 608 being replaced with decision 502 when a preselected fingerprint reference data file is chosen for the surface supported, axially displaced open position electronic device.

When step 607 is replaced with a step 501, the one or more processors select a forefinger fingerprint reference data file and compare the fingerprint data received at step 402 to the forefinger fingerprint reference data file before comparing the fingerprint data to any other fingerprint reference data files stored in the memory of the electronic device. When decision 608 is replaced with decision 602, the one or more processors can determine whether there is a match. Where there is, the method 400 can proceed to step 603 where the electronic device is unlocked in response to the fingerprint data authenticating the user as an authorized user of the electronic device. By contrast, when there is not a match, the method 400 can proceed to step 609 as previously described.

The same process can occur when the user tends to use a thumb to unlock the electronic device when the electronic device is in the axially displaced open position and the mechanical support condition is a surface supported condition. In this condition, step 607 can be replaced with a variant of step 601 in which the one or more processors select a thumb fingerprint reference data file and compare the fingerprint data received at step 402 to the thumb fingerprint reference data file before comparing the fingerprint data to any other fingerprint reference data files stored in the memory of the electronic device. When decision 608 is replaced with decision 602, the one or more processors can determine whether there is a match. Where there is, the method 400 can proceed to step 603 where the electronic device is unlocked in response to the fingerprint data authenticating the user as an authorized user of the electronic device. By contrast, when there is not a match, the method 400 can proceed to step 604 as previously described.

Further illustrations of the method 400 shown in FIGS. 4-6 is provided in FIGS. 7-10. Beginning with FIG. 7, at step 701 the electronic device 100 comprises a first device housing 102 that is pivotable relative to a second device housing 103 between a closed position and an axially displaced open position. At step 701 the electronic device 100 is in the closed position, in a surface supported condition, and in the locked mode of operation. In one or more embodiments, one or more sensors (115) of the electronic device 100 detect both this geometric form factor and mechanical support condition at step 701.

As shown at step 702, in one or more embodiments the electronic device 100 includes a display 120 that is exposed for all geometric form factors. A fingerprint sensor 106 is situated beneath this display 120. Since display 120 is oriented upward, the fingerprint sensor 106 is accessible to the user. At step 702, the fingerprint sensor 106 situated beneath the display 120 receives fingerprint data from a finger touching the display 120 at a location that is collocated with the fingerprint sensor 106.

The electronic device 100 includes a memory (112) storing a plurality of fingerprint reference data files (113). One or more processors (110) of the electronic device select a prioritized fingerprint reference data file from the plurality of fingerprint reference data files (113) as a function of the mechanical support condition and the geometric form factor. In this illustrative embodiment, the prioritized fingerprint reference data file for the closed position and surface supported condition is the forefinger fingerprint reference data file.

The one or more processors (110) then authenticate the authorized user of the electronic device by comparing the fingerprint reference data file to the prioritized fingerprint reference data file before comparing the fingerprint reference data file to any other fingerprint reference data files of the plurality of fingerprint reference data files (113) stored in the memory (112) at step 302.

At step 703, the one or more processors (110) transition the electronic device 100 from the locked mode of operation to an active mode of operation. In one or more embodiments, this comprises the one or more processors (110) of the electronic device 100 unlocking display 120 in response to authenticating the authorized user of the electronic device. In one or more embodiments, the one or more processors (110) of the electronic device 100 unlock display 120 without unlocking other displays of the electronic device 100. For instance, in one or more embodiments step 703 comprises the one or more processors (110) of the electronic device 100 unlocking display 120 without unlocking display (105) whenever the electronic device 100 is in the closed position and a surface supported condition. In other embodiments, the one or more processors (110) will fully unlock the electronic device 100 in response to authenticating the authorized user of the electronic device 100.

Figure 7:
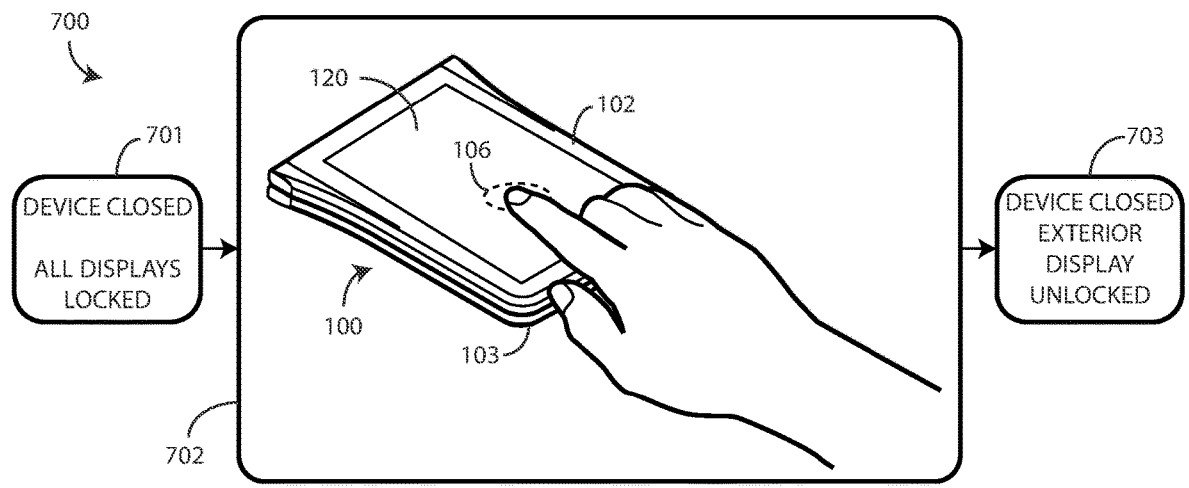
FIG. 7 illustrates one or more method steps in accordance with one or more embodiments of the disclosure.

Advantageously, the method 700 depicted in FIG. 7 allows an authorized user of the electronic device to simply touch the exterior display with a finger to unlock the electronic device 100, which includes unlocking the exterior display. This quick and seamless process allows the authorized user to view content, messages, files, and data without having to pivot the first device housing 102 and the second device housing 103 to the axially displaced open position. Embodiments of the disclosure advantageously use the same fingerprint sensor, i.e., fingerprint sensor 106 situated beneath display 120 to also unlock the other display(s), e.g., display (105), as well. This will be described in more detail below with reference to FIG. 9.

Figure 8:
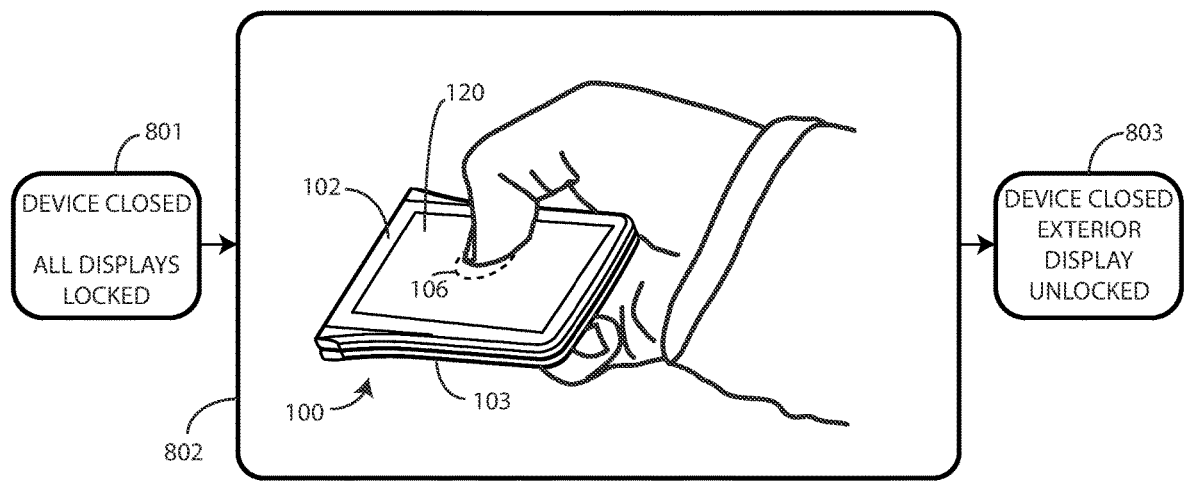
FIG. 8 illustrates one or more method steps in accordance with one or more embodiments of the disclosure.

FIG. 8 contrasts the surface supported condition of FIG. 7 with a hand supported condition. Turning now to FIG. 8, at step 801 the electronic device 100 again comprises a first device housing 102 that is pivotable relative to a second device housing 103 between a closed position and an axially displaced open position. At step 801 the electronic device 100 is in the closed position, in a hand supported condition, and in the locked mode of operation. In one or more embodiments, one or more sensors (115) of the electronic device 100 detect both this geometric form factor and mechanical support condition at step 701.

As shown at step 802, a fingerprint sensor 106 is again situated beneath this display 120. At step 802, the fingerprint sensor 106 situated beneath the display 120 receives fingerprint data from a finger touching the display 120 at a location that is collocated with the fingerprint sensor 106.

At step 802, one or more processors (110) of the electronic device 100 select a prioritized fingerprint reference data file from the plurality of fingerprint reference data files (113) as a function of the mechanical support condition and the geometric form factor. In this illustrative embodiment, the prioritized fingerprint reference data file for the closed position and surface supported condition is the thumb fingerprint reference data file.

The one or more processors (110) then authenticate the authorized user of the electronic device by comparing the fingerprint reference data file to the prioritized fingerprint reference data file before comparing the fingerprint reference data file to any other fingerprint reference data files of the plurality of fingerprint reference data files (113) stored in the memory (112) at step 802.

At step 803, the one or more processors (110) transition the electronic device 100 from the locked mode of operation to an active mode of operation. In one or more embodiments, this comprises the one or more processors (110) of the electronic device 100 unlocking display 120 in response to authenticating the authorized user of the electronic device. In one or more embodiments, the one or more processors (110) of the electronic device 100 unlock display 120 without unlocking other displays of the electronic device 100. For instance, in one or more embodiments step 803 comprises the one or more processors (110) of the electronic device 100 unlocking display 120 without unlocking display (105) whenever the electronic device 100 is in the closed position and a surface supported condition. In other embodiments, the one or more processors (110) will fully unlock the electronic device 100 in response to authenticating the authorized user of the electronic device 100.

Figure 9:
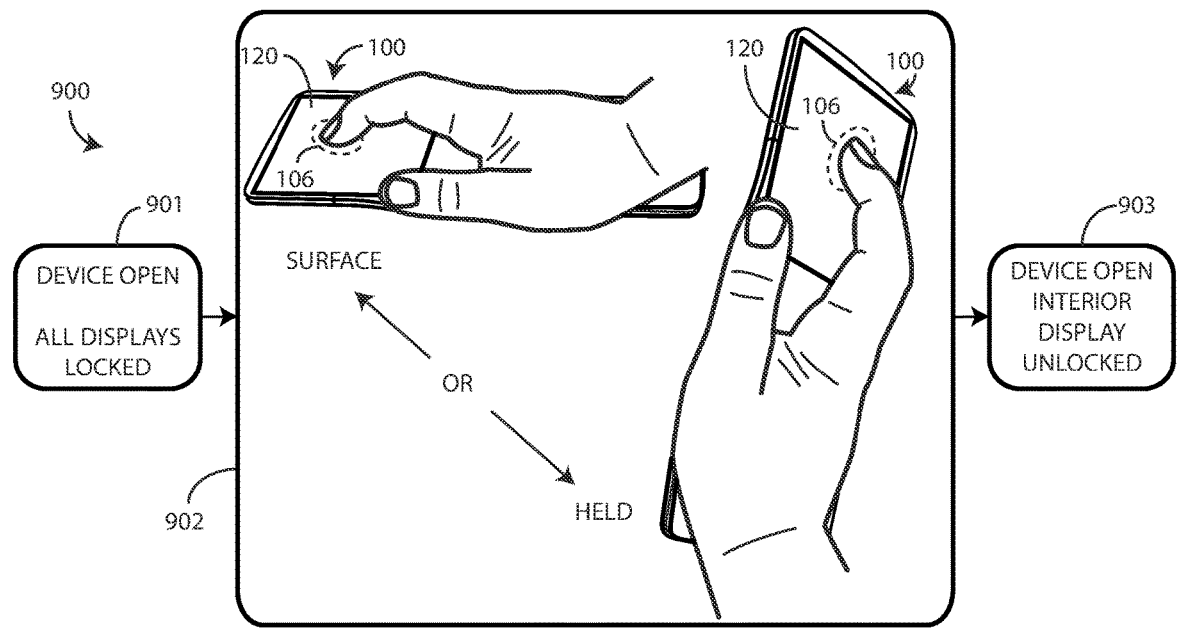
FIG. 9 illustrates one or more method steps in accordance with one or more embodiments of the disclosure.

Turning now to FIG. 9, illustrated therein is a method 900 dealing with the electronic device 100 when in the axially displaced open position. At step 901 the electronic device 100 is in the axially displaced open position. Step 902 shows the electronic device 100 in both a surface supported condition with display 120 oriented upward such that the fingerprint sensor 106 is accessible to the user and a hand supported condition. In this illustrative example, the prioritized fingerprint reference data file for both mechanical support conditions is the forefinger fingerprint reference data file. As noted above, based upon other factors one or both of these mechanical support conditions could have associated therewith a thumb fingerprint reference data file as the prioritized fingerprint reference data file.

At step 901, the electronic device 100 is in the axially displaced open position and in the locked mode of operation. In one or more embodiments, one or more sensors (115) of the electronic device 100 detect this geometric form factor at step 901. Since display 120 is oriented upward, the fingerprint sensor 106 is accessible to the user. The mechanical support condition can also be detected at step 901.

At step 902 the fingerprint sensor 106 situated beneath the display 120 receives fingerprint data from a finger touching the display 120 at a location that is collocated with the fingerprint sensor 106. One or more processors (110) of the electronic device select a prioritized fingerprint reference data file from the plurality of fingerprint reference data files (113) as a function of the mechanical support condition and the geometric form factor at step 902. In this illustrative embodiment, the prioritized fingerprint reference data file for the closed position and surface supported condition is the forefinger fingerprint reference data file.

The one or more processors (110) then authenticate the authorized user of the electronic device at step 903 by comparing the fingerprint reference data file to the prioritized fingerprint reference data file before comparing the fingerprint reference data file to any other fingerprint reference data files of the plurality of fingerprint reference data files (113) stored in the memory (112).

At step 903, the one or more processors (110) transition the electronic device 100 from the locked mode of operation to an active mode of operation. In one or more embodiments, this comprises the one or more processors (110) of the electronic device 100 unlocking display (105) in response to authenticating the authorized user of the electronic device. In one or more embodiments, the one or more processors (110) of the electronic device 100 unlock display (105) without unlocking other displays of the electronic device 100. For instance, in one or more embodiments step 903 comprises the one or more processors (110) of the electronic device 100 unlocking display (105) without unlocking display 120 whenever the electronic device 100 is in the axially displaced open position and in a hand supported condition. In other embodiments, the one or more processors (110) will fully unlock the electronic device 100 in response to authenticating the authorized user of the electronic device 100. In still other embodiments, step 903 comprises the one or more processors (110) of the electronic device 100 unlocking display 120 without unlocking display (105) whenever the electronic device 100 is in the axially displaced open position and in a surface supported condition.

To this point, explanatory embodiments of the disclosure have provided an electronic device comprising a first device housing that is pivotable relative to a second device housing between a closed position and an axially displaced open position. The electronic device includes a first display that is coupled to the first device housing, with the first display being exposed both when the first device housing and the second device housing are in the closed position and when the first device housing and the second device housing are in the axially displaced open position. A fingerprint sensor is situated beneath the first display.

The electronic device used for illustrative explanation has included a second display that is coupled to the first device housing. The second display is concealed when the first device housing and the second device housing are in the closed position and revealed when the first device housing pivots relative to the second device housing to the axially displaced open position. With the inclusion of these two displays, one or more processors of the electronic device unlock the electronic device when the fingerprint sensor situated beneath the first display receives fingerprint data authenticating an authorized user of the electronic device.

Figure 10:
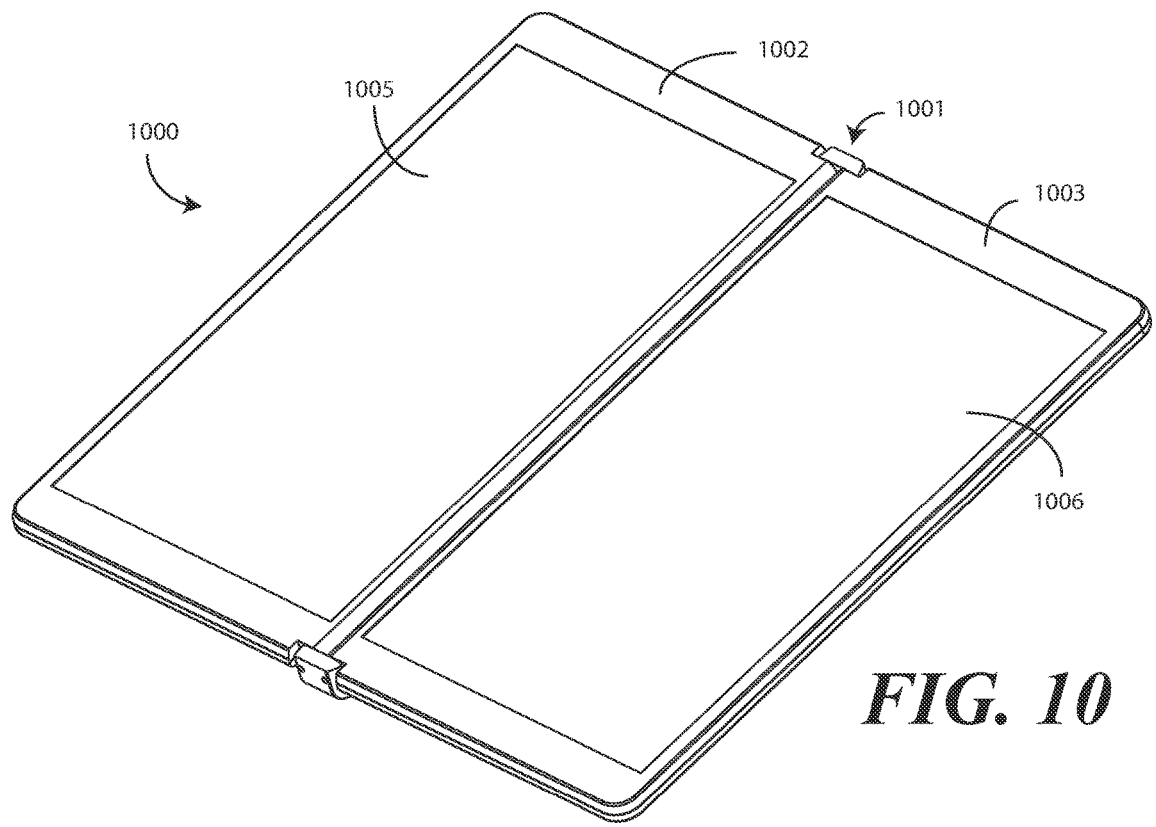
FIG. 10 illustrates another explanatory electronic device configured in accordance with one or more embodiments of the disclosure.

It should be noted that the electronic device could be configured in numerous other ways as well and still offer the benefits and features described herein. Turning to FIG. 10, illustrated therein is one alternative electronic device configured in accordance with one or more embodiments of the disclosure.

As mentioned above, however, not all electronic devices configured in accordance with embodiments of the disclosure employ flexible displays. FIG. 10 illustrates one embodiment where the flexible display. As shown in FIG. 10, an electronic device 1000 includes a first device housing 1002 and a second device housing 1003. A hinge 1001 couples the first device housing 1002 to the second device housing 1003. The first device housing 1002 is pivotable about the hinge 1001 relative to the second device housing 1003 between an axially displaced open position and a closed position, as previously described.

Rather than having a flexible display, in this embodiment the electronic device 1000 includes a first display 1005 coupled to the first device housing 1002 and a second display 1006 coupled to the second device housing 1003.

Thus, in addition to separating the first device housing 1002 from the second device housing 1003, the hinge 1001 separates the first display 1005 from the second display 1006 as well. The unlocking process described above where a fingerprint sensor situated beneath one display unlocks the electronic device using a prioritized fingerprint reference data file can be used with the electronic device 1000 of FIG. 10.

Figure 11:
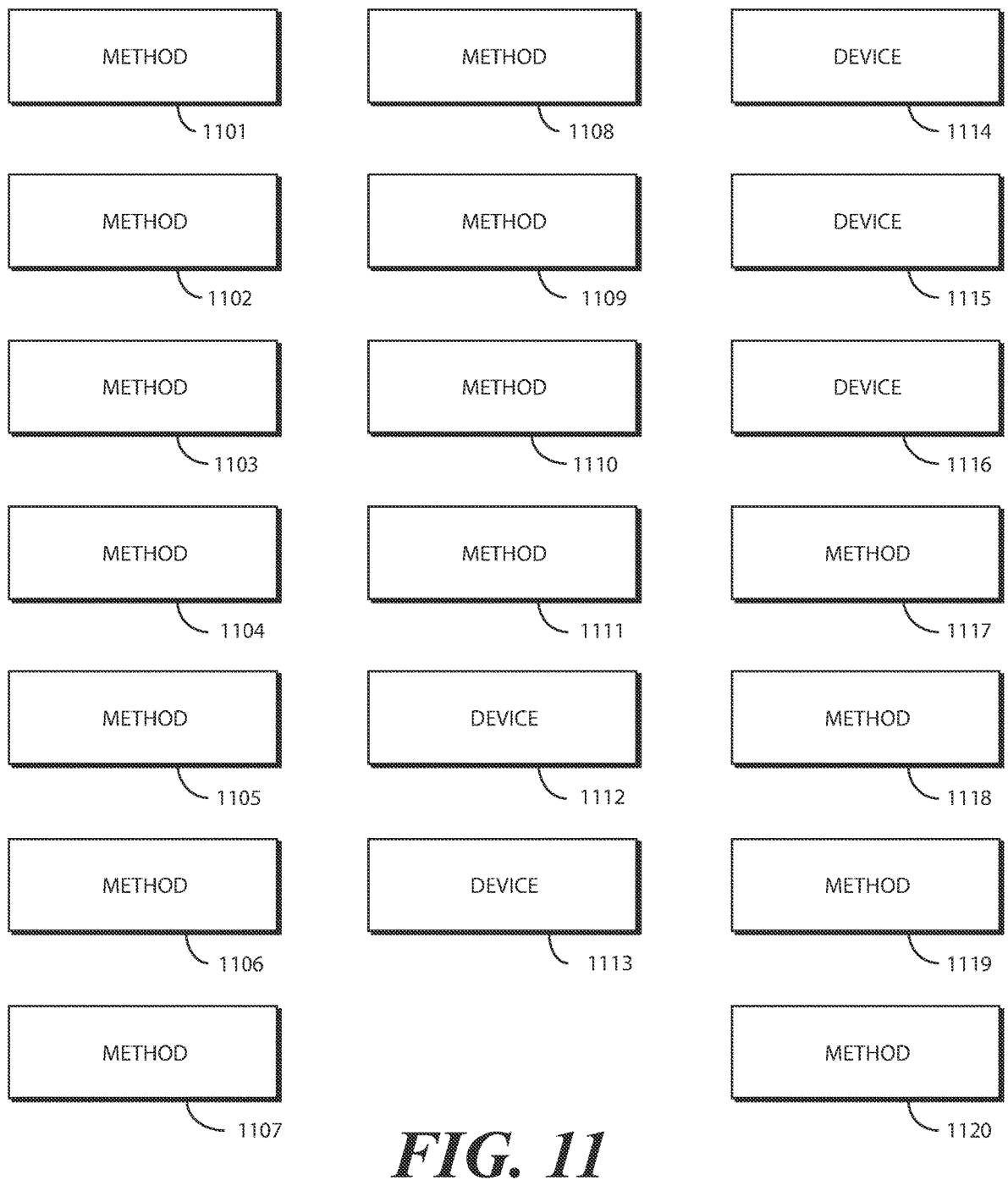
FIG. 11 illustrates one or more embodiments of the disclosure.

Turning now to FIG. 11, illustrated therein are various embodiments of the disclosure. The embodiments of FIG. 11 are shown as labeled boxes in FIG. 11 due to the fact that the individual components of these embodiments have been illustrated in detail in FIGS. 1-10, which precede FIG. 10. Accordingly, since these items have previously been illustrated and described, their repeated illustration is no longer essential for a proper understanding of these embodiments. Thus, the embodiments are shown as labeled boxes.

At 1101, a method in an electronic device comprises detecting a mechanical support condition of the electronic device with one or more sensors. At 1101, the method comprises receiving fingerprint data with a fingerprint sensor of the electronic device.

At 1101, the method comprises authenticating an authorized user of the electronic device with one or more processors by comparing the fingerprint data to a preselected fingerprint data reference file, stored in a memory of the electronic device and selected as a function of the mechanical support condition, before comparing the fingerprint data to any other fingerprint reference data files stored in the memory. At 1101, the method comprises unlocking the electronic device in response to authenticating the authorized user of the electronic device.

At 1102, the electronic device in the method of 1101 comprises a first device housing that is pivotable relative to a second device housing between a closed position and an axially displaced open position. At 1103, the fingerprint sensor of 1102 is situated beneath a display of the electronic device. At 1104, the method of 1102 further comprises determining a geometric form factor of the electronic device with the one or more sensors, wherein the preselected fingerprint reference data file is further selected as a function of the geometric form factor.

At 1105, the mechanical support condition of 1104 comprises a surface supported condition. At 1105, the geometric form factor of 1104 comprises the first device housing and the second device housing pivoted to the closed position. At 1105, the preselected fingerprint data reference file of 1104 comprises a forefinger reference data file.

At 1106, the mechanical support condition of 1104 comprises a surface supported condition. At 1106, the geometric form factor of 1104 comprises the first device housing and the second device housing pivoted to the closed position. At 1106, the preselected fingerprint data reference file of 1104 comprises a thumb reference data file.

At 1107, the mechanical support condition of 1104 comprises a surface supported condition. At 1107, the geometric form factor of 1104 comprises the first device housing and the second device housing pivoted to the axially displaced open position. At 1107, the preselected fingerprint data reference file of 1104 comprises a forefinger reference data file.

At 1108, the mechanical support condition of 1104 comprises a hand supported condition. At 1108, the geometric form factor of 1104 comprises the first device housing and the second device housing pivoted to the closed position. At 1108, The preselected fingerprint data reference file of 1104 comprises a thumb reference data file.

At 1109, the mechanical support condition of 1104 comprises a hand supported condition. At 1109, the geometric form factor of 1104 comprises the first device housing and the second device housing pivoted to the axially displaced open position. At 1109, the preselected fingerprint data reference file of 1104 comprises a forefinger reference data file.

At 1110, the method of 1101 further comprises completing with the one or more processors an enrollment process receiving reference fingerprint data at the fingerprint sensor. At 1110, the method of 1101 further comprises storing the reference fingerprint data as fingerprint reference data files in a memory of the electronic device.

At 1111, the fingerprint data of 1110 corresponds to at least two fingers of the authorized user. At 1111, the fingerprint reference data files of 1110 comprise at least two fingerprint reference data files.

At 1112, an electronic device comprises a memory storing a plurality of fingerprint reference data files. At 1112, the electronic device comprises one or more sensors identifying whether a mechanical support condition of the electronic device is a hand supported condition or a surface supported condition.

At 1112, a fingerprint sensor receiving fingerprint data while the electronic device is in the mechanical support condition. At 1112, one or more processors select a prioritized fingerprint data reference file from the plurality of fingerprint reference data files as a function of the mechanical support condition and authenticate an authorized user of the electronic device by comparing the fingerprint data to the prioritized fingerprint data reference file before comparing the fingerprint data to any other fingerprint reference data files of the plurality of fingerprint reference data files.

At 1113, the one or more processors of 1112 unlock the electronic device in response to authenticating the authorized user of the electronic device. At 1114, the electronic device of 1113 comprises a first device housing that is pivotable relative to a second device housing between a closed position and an axially displaced open position.

At 1115, the one or more sensors of 1114 further identify whether a geometric form factor of the electronic device is the axially displaced open position or the closed position. At 1116, the one or more processors of 1115 further select the prioritized fingerprint data reference file as a function of the geometric form factor.

At 1117, a method in an electronic device comprises enrolling, with a fingerprint sensor, fingerprint data corresponding to at least two fingers of an authorized user of the electronic device by storing, with one or more processors, the fingerprint data as at least two fingerprint reference data files in a memory of the electronic device. At 1117, the method comprises determining, with one or more sensors, a mechanical support condition of the electronic device.

At 1117, the method comprises determining, with the one or more sensors, at least one other condition of the electronic device. In one or more embodiments, the at least one other condition is a geometric form factor of the electronic device.

At 1117, the method comprises receiving additional fingerprint data with the fingerprint sensor while the electronic device is in the mechanical support condition and the at least one other condition. At 1117, the method comprises selecting, by the one or more processors as a function of the mechanical support condition and the at least one other condition, one fingerprint reference data file of the at least two fingerprint reference data files as a selected fingerprint reference data file and authenticating the authorized user of the electronic device by comparing, with the one or more processors, the additional fingerprint data to the selected fingerprint data reference file before comparing the fingerprint data to any other fingerprint reference data file stored in the memory.

At 1118, the enrolling of 1117 comprises determining, by the one or more processors, a device category of the electronic device and a handedness of the authorized user. At 1118, the enrolling comprises identifying, by the one or more processors, at least two fingerprint reference data file types as a function of the device category and the handedness of the authorized user. At 1118, the enrolling comprises detecting, by the one or more processors, enrollment of a first fingerprint reference data file type of the at least two fingerprint reference data file types. At 1118, the enrolling comprises prompting, at a user interface of the electronic device by the one or more processors, for enrollment of at least one other fingerprint reference data file type of the at least to fingerprint reference data file types before terminating the enrolling.

At 1119, the device category of 1118 comprises one of a candy bar device or a clamshell device. At 1119, the handedness of 1118 is one of left handedness or right handedness. At 1120, The at least two fingerprint reference data file types of 1119 comprise a thumb fingerprint reference data file and a forefinger fingerprint reference data file.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An electronic device, comprising:
    a memory storing a plurality of fingerprint reference data files;
    one or more sensors identifying whether a mechanical support condition of the electronic device is a hand supported condition or a surface supported condition;
    a fingerprint sensor receiving fingerprint data while the electronic device is in the mechanical support condition; and
    one or more processors selecting a prioritized fingerprint data reference file from the plurality of fingerprint reference data files as a function of the mechanical support condition and authenticating an authorized user of the electronic device by comparing the fingerprint data to the prioritized fingerprint data reference file before comparing the fingerprint data to any other fingerprint reference data files of the plurality of fingerprint reference data files.

2. The electronic device of claim 1, the one or more processors unlocking the electronic device in response to authenticating the authorized user of the electronic device.

3. The electronic device of claim 2, the electronic device comprising a first device housing that is pivotable relative to a second device housing between a closed position and an axially displaced open position.

4. The electronic device of claim 3, the one or more sensors further identifying whether a geometric form factor of the electronic device is the axially displaced open position or the closed position.

5. The electronic device of claim 4, the one or more processors further selecting the prioritized fingerprint data reference file as a function of the geometric form factor.

6. A method in an electronic device, the method comprising:
    enrolling, with a fingerprint sensor, fingerprint data corresponding to at least two fingers of an authorized user of the electronic device by storing, with one or more processors, the fingerprint data as at least two fingerprint reference data files in a memory of the electronic device;
    determining, with one or more sensors, a mechanical support condition of the electronic device;
    determining, with the one or more sensors, at least one other condition of the electronic device;
    receiving additional fingerprint data with the fingerprint sensor while the electronic device is in the mechanical support condition and the at least one other condition;
    selecting, by the one or more processors as a function of the mechanical support condition and the at least one other condition, one fingerprint reference data file of the at least two fingerprint reference data files as a selected fingerprint reference data file; and
    authenticating the authorized user of the electronic device by comparing, with the one or more processors, the additional fingerprint data to the selected fingerprint data reference file before comparing the fingerprint data to any other fingerprint reference data file stored in the memory.

7. The method of claim 6, the enrolling comprising:
    determining, by the one or more processors, a device category of the electronic device and a handedness of the authorized user;
    identifying, by the one or more processors, at least two fingerprint reference data file types as a function of the device category and the handedness of the authorized user;
    detecting, by the one or more processors, enrollment of a first fingerprint reference data file type of the at least two fingerprint reference data file types; and
    prompting, at a user interface of the electronic device by the one or more processors, for enrollment of at least one other fingerprint reference data file type of the at least to fingerprint reference data file types before terminating the enrolling.

8. The method of claim 7, the device category comprising one of a candy bar device or a clamshell device, the handedness being one of left handedness or right handedness.

9. The method of claim 7, the at least two fingerprint reference data file types comprising a thumb fingerprint reference data file and a forefinger fingerprint reference data file.

10. A method in an electronic device, the method comprising:
    detecting a mechanical support condition of the electronic device with one or more sensors;
    receiving fingerprint data with a fingerprint sensor of the electronic device;

authenticating an authorized user of the electronic device with one or more processors by comparing the fingerprint data to a preselected fingerprint data reference file, stored in a memory of the electronic device and selected as a function of the mechanical support condition, before comparing the fingerprint data to any other fingerprint reference data files stored in the memory; and unlocking the electronic device in response to authenticating the authorized user of the electronic device.

11. The method of claim 10, the electronic device comprising a first device housing that is pivotable relative to a second device housing between a closed position and an axially displaced open position.

12. The method of claim 11, wherein the fingerprint sensor is situated beneath a display of the electronic device.

13. The method of claim 11, further comprising determining a geometric form factor of the electronic device with the one or more sensors, wherein the preselected fingerprint reference data file is further selected as a function of the geometric form factor.

14. The method of claim 13, the mechanical support condition comprising a surface supported condition, the geometric form factor comprising the first device housing and the second device housing pivoted to the closed position, and the preselected fingerprint data reference file comprising a forefinger reference data file.

15. The method of claim 13, the mechanical support condition comprising a surface supported condition, the geometric form factor comprising the first device housing and the second device housing pivoted to the closed position, and the preselected fingerprint data reference file comprising a thumb reference data file.

16. The method of claim 13, the mechanical support condition comprising a surface supported condition, the geometric form factor comprising the first device housing and the second device housing pivoted to the axially displaced open position, and the preselected fingerprint data reference file comprising a forefinger reference data file.

17. The method of claim 13, the mechanical support condition comprising a hand supported condition, the geometric form factor comprising the first device housing and the second device housing pivoted to the closed position, and the preselected fingerprint data reference file comprising a thumb reference data file.

18. The method of claim 13, the mechanical support condition comprising a hand supported condition, the geometric form factor comprising the first device housing and the second device housing pivoted to the axially displaced open position, and the preselected fingerprint data reference file comprising a forefinger reference data file.

19. The method of claim 10, further comprising completing with the one or more processors an enrollment process receiving reference fingerprint data at the fingerprint sensor and storing the reference fingerprint data as fingerprint reference data files in a memory of the electronic device.

20. The method of claim 19, the fingerprint data corresponding to at least two fingers of the authorized user, the fingerprint reference data files comprising at least two fingerprint reference data files.

* * * * *